United States Patent
Hosseini et al.

(10) Patent No.: US 11,252,772 B2
(45) Date of Patent: Feb. 15, 2022

(54) SINGLE TRANSMITTER SWITCHING FOR DUAL CONNECTIVITY

(71) Applicant: QUALCOMM Incorporated, San Diego, CA (US)

(72) Inventors: Seyedkianoush Hosseini, San Diego, CA (US); Alberto Rico Alvarino, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 16/732,132

(22) Filed: Dec. 31, 2019

(65) Prior Publication Data

US 2020/0221523 A1    Jul. 9, 2020

Related U.S. Application Data

(60) Provisional application No. 62/787,868, filed on Jan. 3, 2019.

(51) Int. Cl.
| | | |
|---|---|---|
| H04W 76/15 | (2018.01) | |
| H04L 5/14 | (2006.01) | |
| H04W 72/04 | (2009.01) | |

(52) U.S. Cl.
CPC ........... *H04W 76/15* (2018.02); *H04L 5/14* (2013.01); *H04W 72/04* (2013.01)

(58) Field of Classification Search
CPC ....... H04L 5/0055; H04L 5/14; H04L 1/1854; H04L 5/001; H04W 72/04; H04W 76/15; H04W 72/0446
See application file for complete search history.

(56) References Cited

U.S. PATENT DOCUMENTS

| | | | | |
|---|---|---|---|---|
| 2014/0092786 A1* | 4/2014 | He | .................... | H04W 72/0453 370/280 |
| 2014/0293893 A1* | 10/2014 | Papasakellariou | .......................... | H04W 72/0446 370/329 |

(Continued)

OTHER PUBLICATIONS

Ericsson: "Text Proposal to Clause 8 of 36.213 Regarding Short TTI", 3GPP Draft, R1-1802992—TP TO 36213 Section 8 Revised, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 26, 2018 (Feb. 26, 2018), XP051398377, 13 pages, Retrieved from the Internet: URL: http://www.3gpp.org/ftp/tsg%5Fran/WG1%5FRL1/TSGR1%5F92/Docs/. [retrieved on Feb. 26, 2018] Paragraph 11 8.0 UE procedure for transmitting the physical uplink shared channel.

(Continued)

*Primary Examiner* — Brian D Nguyen
(74) *Attorney, Agent, or Firm* — Holland & Hart LLP

(57) ABSTRACT

Methods, systems, and devices for wireless communications are described. In some cases, a user equipment (UE) may identify, for a carrier aggregation (CA) configuration including a primary cell and one or more secondary cells, a first frame structure configuration for the primary cell and a second frame structure configuration for a secondary cell of the one or more secondary cells. The UE may receive, from a base station, a downlink communication on the secondary cell. The UE may determine a feedback timing for the secondary cell based on the first frame structure configuration for the primary cell and the second frame structure configuration for the secondary cell. The UE may transmit, in response to the received downlink communication, feedback to the base station according to the feedback timing.

29 Claims, 19 Drawing Sheets

(56) References Cited

U.S. PATENT DOCUMENTS

| | | | |
|---|---|---|---|
| 2019/0007942 A1* | 1/2019 | Takeda | H04W 72/0446 |
| 2019/0103947 A1* | 4/2019 | Park | H04L 1/1896 |
| 2020/0052811 A1* | 2/2020 | Li | H04L 5/0007 |
| 2020/0145140 A1* | 5/2020 | Lee | H04L 1/1819 |
| 2020/0170012 A1* | 5/2020 | Takeda | H04W 72/0413 |
| 2020/0295810 A1* | 9/2020 | Baldemair | H04L 1/1822 |
| 2020/0344832 A1* | 10/2020 | Hu | H04W 72/048 |
| 2021/0144715 A1* | 5/2021 | Gotoh | H04W 76/27 |

OTHER PUBLICATIONS

Huawei et al., "TDM of LTE and NR Uplinks for LTE-NR Dual Connectivity", 3GPP Draft, R1-1712163, 3rd Generation Partnership Project (3GPP), Mobile Competence Centre, 650, Route Des Lucioles, F-06921 Sophia-Antipolis Cedex, France vol. RAN WG1. No. Prague, Czech Republic, Aug. 21, 2017-Aug. 25, 2017, Aug. 20, 2017 (Aug. 20, 2017), XP051314982, 7 Pages, Retrieved from the Internet: URL: http://www.3gpp.org/ftp/Meetings_3GPP_SYNC/RAN1/Docs/ [retrieved on Aug. 20, 2017].
International Search Report and Written Opinion—PCT/US2020/012028—ISA/EPO—dated Apr. 1, 2020.

* cited by examiner

SINGLE TRANSMITTER SWITCHING FOR DUAL CONNECTIVITY

CROSS REFERENCE

The present application for patent claims the benefit of U.S. Provisional Patent Application No. 62/787,868 by HOSSEINI et al., entitled "SINGLE TRANSMITTER SWITCHING FOR DUAL CONNECTIVITY," filed Jan. 3, 2019, assigned to the assignee hereof, and expressly incorporated herein.

BACKGROUND

The following relates generally to wireless communications, and to single transmitter switching for dual connectivity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support single transmitter switching for dual connectivity. Generally, the described techniques provide for a user equipment (UE) to receive system information block (SIB)-configured primary cell (PCell) and/or secondary cell (SCell) time division duplexing (TDD) uplink-downlink configurations that indicate frame structure configurations for a first base station serving a PCell (and zero or more SCells), and a second base station serving the SCell (and zero or more additional SCells), respectively. Additionally, a UE may receive a radio resource control (RRC)-configured PCell TDD uplink-downlink reference configuration which may indicate which uplink subframes of the SIB-configured PCell frame structure configuration are usable for hybrid automatic repeat request (HARQ)-related transmissions (e.g., transmission of acknowledgements (ACKs) and/or non-acknowledgements (NACKs)). The UE may compare (e.g., via a table or index pairs) an index of the SIB-configured SCell TDD uplink-downlink configuration with the RRC-configured PCell TDD uplink-downlink reference configuration, and may determine a SCell TDD uplink-downlink reference configuration. The UE may use the SCell uplink-downlink reference configuration to determine which uplink subframes of the SIB-configured SCell frame structure configuration are usable for HARQ-related transmissions (e.g., transmission of ACKs and/or NACKs).

A method of wireless communication at a UE is described. The method may include identifying, for a carrier aggregation configuration including a primary cell and one or more secondary cells, a first frame structure configuration for the primary cell and a second frame structure configuration for a secondary cell of the one or more secondary cells, receiving, from a base station, a downlink communication on the secondary cell, determining a feedback timing for the secondary cell based on the first frame structure configuration for the primary cell and the second frame structure configuration for the secondary cell, and transmitting, in response to the received downlink communication, feedback to the base station according to the determined feedback timing.

An apparatus for wireless communication at a UE is described. The apparatus may include a processor, memory in electronic communication with the processor, and instructions stored in the memory. The instructions may be executable by the processor to cause the apparatus to identify, for a carrier aggregation configuration including a primary cell and one or more secondary cells, a first frame structure configuration for the primary cell and a second frame structure configuration for a secondary cell of the one or more secondary cells, receive, from a base station, a downlink communication on the secondary cell, determine a feedback timing for the secondary cell based on the first frame structure configuration for the primary cell and the second frame structure configuration for the secondary cell, and transmit, in response to the received downlink communication, feedback to the base station according to the determined feedback timing.

Another apparatus for wireless communication at a UE is described. The apparatus may include means for identifying, for a carrier aggregation configuration including a primary cell and one or more secondary cells, a first frame structure configuration for the primary cell and a second frame structure configuration for a secondary cell of the one or more secondary cells, receiving, from a base station, a downlink communication on the secondary cell, determining a feedback timing for the secondary cell based on the first frame structure configuration for the primary cell and the second frame structure configuration for the secondary cell, and transmitting, in response to the received downlink communication, feedback to the base station according to the determined feedback timing.

A non-transitory computer-readable medium storing code for wireless communication at a UE is described. The code may include instructions executable by a processor to identify, for a carrier aggregation configuration including a primary cell and one or more secondary cells, a first frame structure configuration for the primary cell and a second frame structure configuration for a secondary cell of the one or more secondary cells, receive, from a base station, a downlink communication on the secondary cell, determine a feedback timing for the secondary cell based on the first frame structure configuration for the primary cell and the second frame structure configuration for the secondary cell, and transmit, in response to the received downlink communication, feedback to the base station according to the determined feedback timing.

In some examples of the method, apparatuses, and non-transitory computer-readable medium described herein, determining the feedback timing may include operations, features, means, or instructions for identifying a third frame structure configuration based on the first frame structure configuration and the second frame structure configuration, and determining the feedback timing according to the identified third frame structure configuration.

In some examples of the method, apparatuses, and non-transitory computer-readable medium described herein, identifying the third frame structure configuration may include operations, features, means, or instructions for mapping a first indicator of the first frame structure configuration and a second indicator of the second frame structure configuration to a third indicator of the third frame structure configuration.

In some examples of the method, apparatuses, and non-transitory computer-readable medium described herein, the third frame structure configuration may be a different frame structure configuration than the first frame structure configuration and the second frame structure configuration.

In some examples of the method, apparatuses, and non-transitory computer-readable medium described herein, the third frame structure configuration may be a same frame structure configuration as the first frame structure configuration or the second frame structure configuration.

Some examples of the method, apparatuses, and non-transitory computer-readable medium described herein may further include operations, features, means, or instructions for receiving an indication of the second frame structure configuration for the secondary cell, the received indication of the second frame structure configuration identifying at least one uplink transmission time interval (TTI) of the secondary cell for the downlink communication from the base station, where the second frame structure configuration may be identified based on the received indication of the second frame structure configuration.

In some examples of the method, apparatuses, and non-transitory computer-readable medium described herein, receiving the indication of the second frame structure configuration may include operations, features, means, or instructions for receiving system information including the indication of the second frame structure configuration.

Some examples of the method, apparatuses, and non-transitory computer-readable medium described herein may further include operations, features, means, or instructions for receiving an indication of the first frame structure configuration for the primary cell, the received indication of the first frame structure configuration identifying at least one uplink TTI of the primary cell for feedback in response to downlink communications from the base station, where the first frame structure configuration may be identified based on the received indication of the first frame structure configuration.

Some examples of the method, apparatuses, and non-transitory computer-readable medium described herein may further include operations, features, means, or instructions for receiving an indication of a third frame structure configuration for the primary cell, the third frame structure configuration identifying at least one downlink TTI for downlink communications from the base station on the primary cell, and determining a feedback timing for the primary cell based on the first frame structure configuration for the primary cell and the third frame structure configuration for the primary cell.

In some examples of the method, apparatuses, and non-transitory computer-readable medium described herein, receiving the indication of the third frame structure configuration may include operations, features, means, or instructions for receiving system information including the indication of the third frame structure configuration.

In some examples of the method, apparatuses, and non-transitory computer-readable medium described herein, receiving the indication of the first frame structure configuration may include operations, features, means, or instructions for receiving radio resource control signaling including the indication of the first frame structure configuration.

In some examples of the method, apparatuses, and non-transitory computer-readable medium described herein, the primary cell operates according to a frequency division duplexing mode or a time division duplexing mode, and the secondary cell operates according to the time division duplexing mode.

In some examples of the method, apparatuses, and non-transitory computer-readable medium described herein, the carrier aggregation configuration includes a dual connectivity configuration including a master cell group and a secondary cell group, the primary cell in the master cell group and the secondary cell in the secondary cell group.

In some examples of the method, apparatuses, and non-transitory computer-readable medium described herein, the master cell group operates according to a first radio access technology, and the secondary cell group operates according to a second radio access technology.

In some examples of the method, apparatuses, and non-transitory computer-readable medium described herein, the UE may be configured for single transmitter operation.

Some examples of the method, apparatuses, and non-transitory computer-readable medium described herein may further include operations, features, means, or instructions for receiving an indication of a time division multiplexing pattern, and transmitting, according to the time division multiplexing pattern, an uplink transmission using a shortened TTI on the secondary cell, the secondary cell configured to operate according to a frequency division duplexing mode.

A method of wireless communication at a base station is described. The method may include identifying a carrier aggregation configuration including a primary cell and one or more secondary cells, a first frame structure configuration for the primary cell being different from a second frame structure configuration for a secondary cell of the one or more secondary cells, determining a feedback timing for the secondary cell based on the first frame structure configuration for the primary cell and the second frame structure configuration for the secondary cell, transmitting, to a UE, a downlink communication on the secondary cell, and receiving, in response to the transmitted downlink communication, feedback from the UE according to the determined feedback timing.

An apparatus for wireless communication at a base station is described. The apparatus may include a processor, memory in electronic communication with the processor, and instructions stored in the memory. The instructions may be executable by the processor to cause the apparatus to identify a carrier aggregation configuration including a primary cell and one or more secondary cells, a first frame structure configuration for the primary cell being different from a second frame structure configuration for a secondary cell of the one or more secondary cells, determine a feedback timing for the secondary cell based on the first frame structure configuration for the primary cell and the second frame structure configuration for the secondary cell, transmit, to a UE, a downlink communication on the secondary cell, and receive, in response to the transmitted downlink communication, feedback from the UE according to the determined feedback timing.

Another apparatus for wireless communication at a base station is described. The apparatus may include means for identifying a carrier aggregation configuration including a primary cell and one or more secondary cells, a first frame structure configuration for the primary cell being different from a second frame structure configuration for a secondary cell of the one or more secondary cells, determining a feedback timing for the secondary cell based on the first frame structure configuration for the primary cell and the second frame structure configuration for the secondary cell, transmitting, to a UE, a downlink communication on the secondary cell, and receiving, in response to the transmitted downlink communication, feedback from the UE according to the determined feedback timing.

A non-transitory computer-readable medium storing code for wireless communication at a base station is described. The code may include instructions executable by a processor to identify a carrier aggregation configuration including a primary cell and one or more secondary cells, a first frame structure configuration for the primary cell being different from a second frame structure configuration for a secondary cell of the one or more secondary cells, determine a feedback timing for the secondary cell based on the first frame structure configuration for the primary cell and the second frame structure configuration for the secondary cell, transmit, to a UE, a downlink communication on the secondary cell, and receive, in response to the transmitted downlink communication, feedback from the UE according to the determined feedback timing.

In some examples of the method, apparatuses, and non-transitory computer-readable medium described herein, determining the feedback timing may include operations, features, means, or instructions for identifying a third frame structure configuration based on the first frame structure configuration and the second frame structure configuration, and determining the feedback timing according to the identified third frame structure configuration.

In some examples of the method, apparatuses, and non-transitory computer-readable medium described herein, identifying the third frame structure configuration may include operations, features, means, or instructions for mapping a first indicator of the first frame structure configuration and a second indicator of the second frame structure configuration to a third indicator of the third frame structure configuration.

In some examples of the method, apparatuses, and non-transitory computer-readable medium described herein, the third frame structure configuration may be a different frame structure configuration than the first frame structure configuration and the second frame structure configuration.

In some examples of the method, apparatuses, and non-transitory computer-readable medium described herein, the third frame structure configuration may be a same frame structure configuration as the first frame structure configuration or the second frame structure configuration.

Some examples of the method, apparatuses, and non-transitory computer-readable medium described herein may further include operations, features, means, or instructions for transmitting an indication of the second frame structure configuration for the secondary cell, the transmitted indication of the second frame structure configuration identifying at least one uplink TTI of the secondary cell for the downlink communication to the UE, where the second frame structure configuration may be identified based on the indication of the second frame structure configuration.

In some examples of the method, apparatuses, and non-transitory computer-readable medium described herein, transmitting the indication of the second frame structure configuration may include operations, features, means, or instructions for transmitting system information including the indication of the second frame structure configuration.

Some examples of the method, apparatuses, and non-transitory computer-readable medium described herein may further include operations, features, means, or instructions for transmitting an indication of the first frame structure configuration for the primary cell, the transmitted indication of the first frame structure configuration identifying at least one uplink TTI of the primary cell for feedback in response to downlink communications from the base station, where the first frame structure configuration may be identified based on the transmitted indication of the first frame structure configuration.

Some examples of the method, apparatuses, and non-transitory computer-readable medium described herein may further include operations, features, means, or instructions for transmitting an indication of a third frame structure configuration for the primary cell, the third frame structure configuration identifying at least one downlink TTI for downlink communications from the base station on the primary cell, and determining a feedback timing for the primary cell based on the first frame structure configuration for the primary cell and the third frame structure configuration for the primary cell.

In some examples of the method, apparatuses, and non-transitory computer-readable medium described herein, transmitting the indication of the third frame structure configuration may include operations, features, means, or instructions for transmitting system information including the indication of the third frame structure configuration.

In some examples of the method, apparatuses, and non-transitory computer-readable medium described herein, transmitting the indication of the first frame structure configuration may include operations, features, means, or instructions for transmitting radio resource control signaling including the indication of the first frame structure configuration.

In some examples of the method, apparatuses, and non-transitory computer-readable medium described herein, the primary cell operates according to a frequency division duplexing mode or a time division duplexing mode, and the secondary cell operates according to the time division duplexing mode.

In some examples of the method, apparatuses, and non-transitory computer-readable medium described herein, the carrier aggregation configuration includes a dual connectivity configuration including a master cell group and a secondary cell group, the primary cell in the master cell group and the secondary cell in the secondary cell group.

In some examples of the method, apparatuses, and non-transitory computer-readable medium described herein, the master cell group operates according to a first radio access technology, and the secondary cell group operates according to a second radio access technology.

In some examples of the method, apparatuses, and non-transitory computer-readable medium described herein, the UE may be configured for single transmitter operation.

Some examples of the method, apparatuses, and non-transitory computer-readable medium described herein may further include operations, features, means, or instructions for transmitting an indication of a time division multiplexing pattern, and receiving, according to the time division multiplexing pattern, an uplink transmission using a shortened TTI on the secondary cell, the secondary cell configured to operate according to a frequency division duplexing mode.

DETAILED DESCRIPTION

Figure 1:
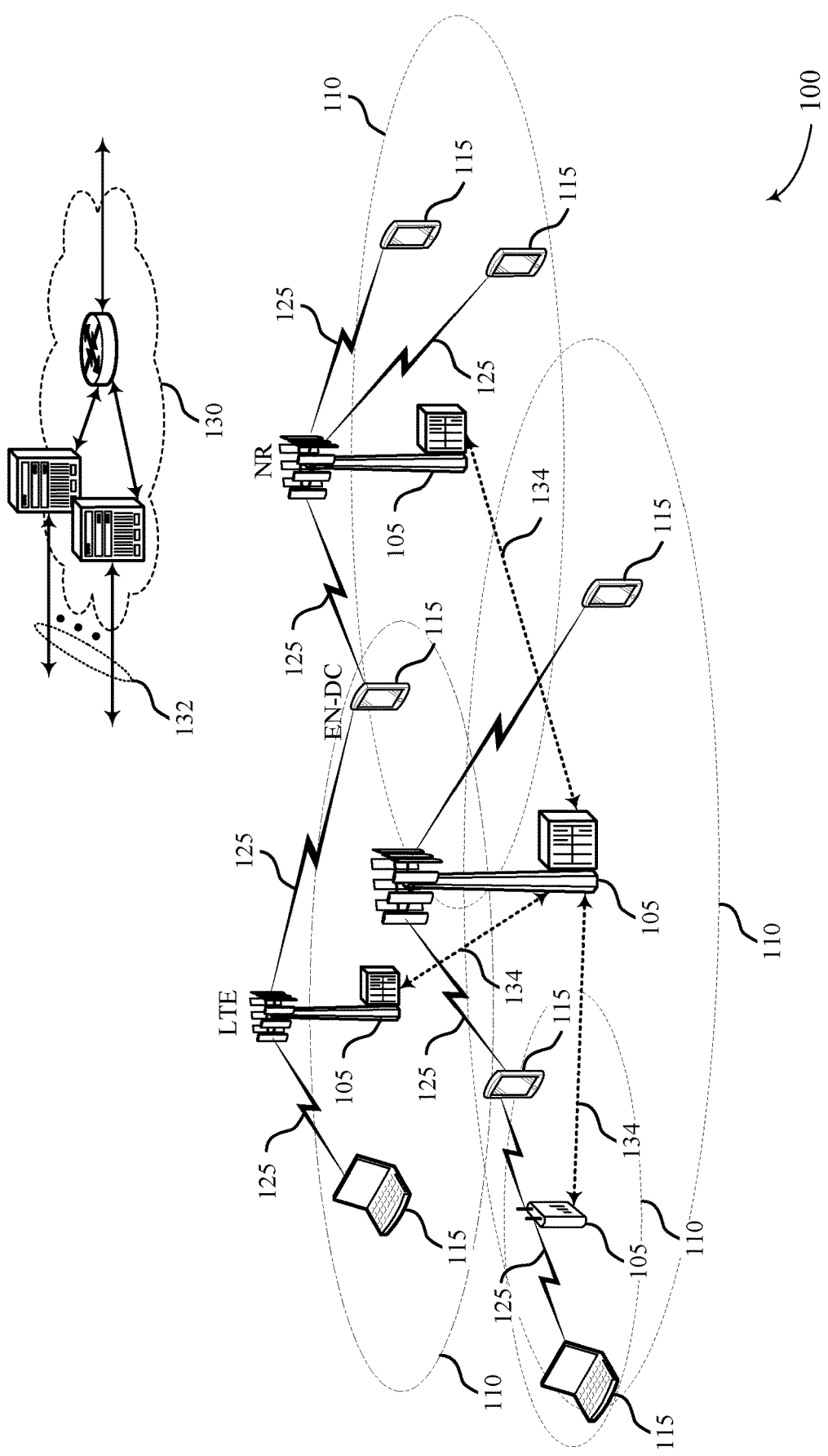
FIG. 1 illustrates an example of a wireless communications system that supports single transmitter switching for dual connectivity in accordance with aspects of the present disclosure.

Two or more base stations may participate in dual connectivity (e.g., in evolved universal terrestrial radio access (E-UTRA) new radio (NR) dual connectivity (EN-DC)) with a user equipment (UE), which may involve a first base station operating as a primary cell (PCell) and other base stations operating as secondary cells (SCells). A UE operating within EN-DC may, in some cases, operate in a single transmitter (single-Tx) operation mode, which may involve transmitting over one radio access technology (RAT) (e.g., LTE or NR) at a given time (e.g., over a subframe, transmission time interval (TTI), or shortened TTI (sTTI)).

When operating in a single transmitter mode, a PCell may perform frequency division duplexing (FDD) and/or time division duplexing (TDD). Additionally or alternatively, the PCell may performing time division multiplexing (TDM). TDD may involve scheduling downlink and uplink transmissions for a base station in distinct subframes, TTIs, and/or sTTIs. A PCell performing TDD may utilize hybrid automatic repeat request (HARQ) to determine if downlink transmissions (e.g., on a physical downlink shared channel (PDSCH)) sent over one or more subframes, TTIs, and/or sTTIs were received by the UE. The PCell may make such a determination based on receiving an acknowledgement (ACK) or non-acknowledgement (NACK) from the UE over an uplink transmission. In some cases, a UE may not be properly scheduled by a base station for each LTE downlink subframes for HARQ acknowledgement. For instance, subframes utilized for NR uplink transmissions may not carry ACKs and/or NACKs for previously scheduled downlink transmissions, but the UE may determine that they do. As such, not all LTE downlink subframes may be schedulable.

One alternative is to enable LTE downlink HARQ to follow an enhanced interference mitigation and traffic adaptation (eIMTA) approach. For instance, downlink HARQ (e.g., on a PCell and/or one or more SCells) may follow a radio resource control (RRC)-configured PCell time division duplexing (TDD) uplink-downlink reference configuration. In such cases, LTE uplink control may be restricted to a subframe subset, which may enable a UE to transmit NR uplink transmissions on subframes that are outside the subframe subset. Such an alternative may enable each downlink subframe of a frame to be schedulable. This approach, however, may not properly account for scheduling of TDD SCells.

A UE may receive system information block (SIB)-configured PCell and/or SCell TDD uplink-downlink configurations that indicate frame structure configurations for base stations serving PCells and/or SCells, respectively. In some cases, the PCell and/or SCell TDD uplink-downlink configurations may operate according to a TDD or a FDD scheme. Additionally, a UE may receive a RRC-configured PCell TDD uplink-downlink reference configuration which may indicate which uplink subframes of the SIB-configured PCell frame structure configuration are usable for HARQ-related transmissions (e.g., transmission of ACKs and/or NACKs). The UE may compare (e.g., via index pairs or a table) an index of the SIB-configured SCell TDD uplink-downlink configuration with the RRC-configured PCell TDD uplink-downlink reference configuration, and may determine a SCell TDD uplink-downlink reference configuration. In some cases (e.g., when the UE is communicating with base stations serving TDD SCells), the UE may use the SCell uplink-downlink reference configuration to determine which uplink subframes of the SIB-configured SCell frame structure configuration are usable for HARQ-related transmissions (e.g., transmission of ACKs and/or NACKs). Additionally or alternatively, when the UE is communicating with base stations serving FDD SCells, the downlink HARQ timing of the FDD SCell may be the same as the timing given by the RRC-configured PCell frame structure.

Aspects of the disclosure are initially described in the context of a wireless communications system. Aspects of the disclosure are additionally described in the context of an additional wireless communications system, an SCell HARQ timing procedure, and a process flow. Aspects of the disclosure are further illustrated by and described with reference to apparatus diagrams, system diagrams, and flowcharts that relate to single transmitter switching for dual connectivity.

FIG. 1 illustrates an example of a wireless communications system 100 that supports single transmitter switching for dual connectivity in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support mission critical functions, and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on FDD, TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of sTTIs or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Techniques described herein may use a form of carrier aggregation such as dual connectivity of a UE 115 to multiple base stations, for example a first base station operating according to a first radio access technology (RAT) and a second base station operating according to a second RAT. In some examples UE 115 may use an EN-DC configuration that supports uplink sharing between E-UTRA and NR (e.g., when used in conjunction with non-standalone (NSA) mode and options 3 or 3*a*). When operating according to EN-DC, a UE 115 (e.g., the UE 115 in FIG. 1 labeled "EN-DC") may be simultaneously connected to E-UTRA (e.g., via a base station 105, such as the base station 105 in FIG. 1 labeled "LTE") and NR (e.g., via a base station 105, such as the base station 105 in FIG. 1 labeled "NR") and may perform LTE and/or NR communications. In some cases, a master node serving a PCell may operate according to LTE and a serving node serving an SCell may operate according to NR. In other cases, the master node may, additionally or alternatively, operate according to NR and/or the serving node may, additionally or alternatively, operate according to LTE. Though the techniques described herein may be discussed in the context of an LTE RAT and an NR RAT, the techniques are generally applicable to dual connectivity using other RATs, including the same RAT used for each of two or more base stations of the dual connectivity configuration, or a single base station operating according to multiple different RATs.

In general, a UE 115 operating in EN-DC may support single transmitter (single-Tx) operation or dual transmitter (dual-Tx) operation. Single transmitter operation may involve the UE 115 either transmitting in one RAT (e.g., LTE) or another (e.g., NR) at a given time, but not both. For example, in single transmitter operation for EN-DC, UE 115 may be configured for transmission on a first uplink carrier for the first RAT, and a second uplink carrier for the second RAT. Dual transmitter operation may involve the UE 115 transmitting in two RATs simultaneously (e.g., both LTE and NR). Utilizing single transmitter operation may mitigate receiver de-sensing, which may occur when an image of a band of a UE 115 falls into another band, such as a band of another UE 115 (e.g., in intraband combinations DC_1_n_77, DC_3_n77, and DC__3_n78). Additionally or alternatively, utilizing single transmitter operation may satisfy emission constraints (e.g., a constraint on an additional maximum power reduction (A-MPR)) that may not be satisfied under dual transmitter operation (e.g., in intraband combination DC_41_n41).

Wireless communications system 100 may support efficient techniques for single transmitter switching for EN-DC. For instance, a UE 115 may identify, for a CA configuration including a PCell (e.g., a base station 105) and one or more SCells (e.g., one or more base stations 105), a first frame structure configuration for the PCell and a second frame structure configuration for a SCell of the one or more SCells. The UE 115 may receive, from a base station 105, a downlink communication (e.g., a PDSCH) on the SCell. The UE 115 may determine a feedback timing for the SCell based on the first frame structure configuration for the PCell and the second frame structure configuration for the SCell. The UE 115 may transmit, in response to the received downlink communication, feedback (e.g., HARQ feedback) to the base station according to the determined feedback timing.

Figure 2:
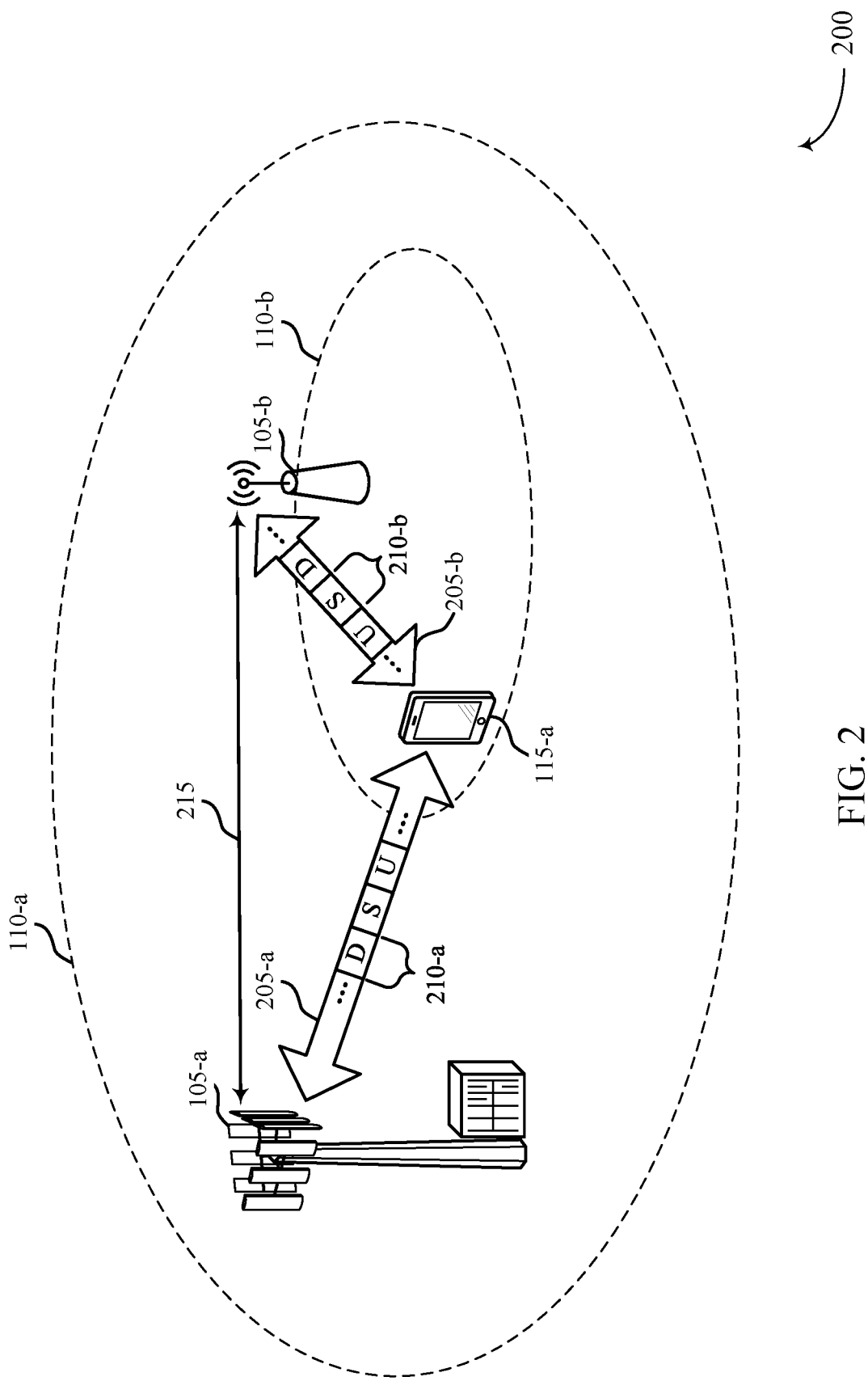
FIG. 2 illustrates an example of a wireless communications system that supports single transmitter switching for dual connectivity in accordance with aspects of the present disclosure.

FIG. 2 illustrates an example of a wireless communications system 200 that supports single transmitter switching for dual connectivity in accordance with aspects of the present disclosure. In some examples, wireless communications system 200 may implement aspects of wireless communications system 100. For instance, wireless communications system 200 may include base stations 105-*a* and 105-*b*, which may be examples of aspects of base stations 105 as described with reference to FIG. 1, and may include UE 115-*a*, which may be an example of aspects of UEs 115 as described with reference FIG. 1.

Base station 105-*a* may perform wireless communications with UE 115-*a* over a communication link 205-*a* and may have a coverage area 110-*a*. Base station 105-*b* may perform wireless communications with UE 115-*a* over a communication link 205-*b* and may have a coverage area 110-*b*. In some cases, base station 105-*a* may serve a PCell and base station 105-*b* may serve an SCell. In some examples, in addition to the PCell, base station 105-*a* may additionally serve one or more secondary cells. For base station 105-*a*, the PCell and one or more secondary cells may be grouped into one or more groups, which may include the master cell group (MCG). Similarly, base station 105-*b* may additionally serve one or more secondary cells. For base station 105-*b*, the SCell and one or more secondary cells may be grouped into one or more groups, which may include a secondary cell group (SCG). The SCell of base station 105-*b* may be the primary secondary cell (PSCell) of the SCG.

Communication links 205-*a* and 205-*b* may both communicate according to a frame structure that includes subframes 210. The subframes 210 for each communication link 205 (e.g., subframes 210-*a* for communication link 205-*a* and subframes 210-*b* for communication link 205-*b*) may be synchronized with each other and may have a time duration equal to a TTI. Additionally or alternatively, each subframe 210 of the frame structure may be one of a downlink subframe (e.g., denoted by a "D"), a special subframe (e.g., denoted by a "S"), or an uplink subframe (e.g., denoted by a "U"). Downlink subframes may carry downlink transmissions (e.g., physical downlink control channel (PDCCH) or a PDSCH); special subframes may carry reference signals (e.g., a sounding reference signal (SRS)) and/or control information; and uplink subframes may carry uplink transmissions (e.g., a physical uplink control channel (PUCCH) or a physical uplink shared channel (PUSCH)). A type of a subframe 210 (e.g., downlink) occurring in communication link 205-*a* over a given TTI may be different from a type of a subframe 210 (e.g., uplink) occurring in communication link 205-*b* over the same TTI.

In some cases, a fixed quantity of the subframes 210 and/or TTIs (e.g., 10 subframes 210 and/or TTIs) may make up a frame. The subframes may be arranged into a configuration that indicates a pattern of types of subframes (e.g., downlink, special, and uplink subframes), where the pattern may repeat each frame (e.g., a TDD uplink-downlink configuration) In some cases, base station 105-*a* (e.g., a PCell) may have a different frame structure configuration from base station 105-*b* (e.g., an SCell). Base station 105-*a* may indicate the frame structure configuration for base station 105-*a* and/or base station 105-*b* through a SIB message (e.g., SIB1). For instance, SIB1 may carry a SIB1-configured TDD uplink-downlink configuration index, which may indicate a frame structure configuration for base station 105-*a*, and may carry a SIB1-configured SCell TDD uplink-downlink configuration index, which may indicate a frame structure configuration for base station 105-*b*.

If base stations 105-*a* and 105-*b* and UE 115-*a* are configured to communicate according to a single transmitter EN-DC configuration, a given uplink subframe 210 may carry transmissions for a single RAT (e.g., LTE or NR). Subframes used for LTE uplink transmissions may carry uplink transmissions that include HARQ ACKs or NACKs corresponding to scheduled downlink transmissions (e.g., PDSCHs) received within previous downlink subframes 210. Uplink subframes 210 used for NR uplink transmission, however, may not carry uplink transmissions that include HARQ for previous downlink subframes 210.

To enable UE 115-a to transmit HARQ on subframes 210 for LTE uplink transmissions, base station 105-a may indicate a PCell TDD uplink-downlink reference configuration to UE 115-a. UE 115-a may determine a downlink channel HARQ (e.g., PDSCH HARQ) timing from the reference PCell uplink-downlink configuration, which the UE 115-a may use to determine during what subframes 210 to transmit ACKs and/or NACKs. For example, UE 115-a may use the PCell TDD uplink-downlink configuration indicated by SIB1, but may use a downlink HARQ timing that follows the indicated PCell TDD uplink-downlink reference configuration. Base station 105-a may indicate the reference PCell uplink-downlink configuration through an RRC message (e.g., via an index of the PCell TDD uplink-downlink reference configuration) or other signaling, either of which may be UE-specific. The HARQ timing may be selected to prevent UE 115-a from scheduling ACK and/or NACK transmissions on at least some uplink subframes that may carry NR uplink transmissions.

In some cases (e.g., when base station 105-b is serving a TDD SCell), UE 115-a may determine a downlink channel HARQ timing (e.g., PDSCH HARQ) for uplink transmissions (e.g., ACK and/or NACK transmissions) of base station 105-b based on the RRC-configured PCell uplink-downlink reference configuration and a SIB1-configured SCell TDD uplink-downlink configuration indicated by SIB1. For instance, UE 115-a may determine an SCell TDD uplink-downlink reference configuration based on the RRC-configured PCell TDD uplink-downlink reference configuration and the SIB1-configured SCell TDD uplink-downlink configuration, and may determine a downlink channel HARQ timing that follows the SCell TDD uplink-downlink reference configuration. UE 115-a may determine the SCell TDD uplink-downlink reference configuration by comparing an index of the RRC-configured PCell TDD uplink-downlink reference configuration and an index of the SIB1-configured SCell TDD uplink-downlink configuration.

In some cases, downlink and uplink transmissions may be sent over sTTIs. In such cases, each subframe 210 may include multiple sTTIs, where each sTTI may be one of a downlink sTTI, an uplink sTTI, or a special sTTI. Downlink sTTIs and uplink sTTIs may be configured to have different lengths according to a {downlink, uplink} configuration. For instance, if the configuration is {2,2}, downlink sTTIs may have a length of 2 symbols and uplink sTTIs may have a length of 2 symbols. If the configuration is {2,7}, downlink sTTIs may have a length of 2 symbols and uplink sTTIs may have a length of 7 symbols. If the configuration is {7,7}, downlink sTTIs may have a length of 7 symbols and uplink sTTIs may have a length of 7 symbols. UE 115-a may support the {2,2} and {2,7} configurations if base station 105-a serves a FDD PCell and UE 115-a may support the {7,7} configuration if base station 105-a serves a FDD or a TDD PCell. In general, UE 115-a may report its capability for supporting each configuration on a per band of a band combination (BoBC) basis.

If EN-DC (e.g., single transmitter EN-DC) is configured for UE 115-a, then downlink HARQ timing similar to that used for TDD PCells may be configured for base station 105-a, even if base station 105-a is a FDD PCell. Base station 105-a may configure such a similar downlink reference timing based on receiving an indication from UE 115-a (e.g., tdm-Pattern) that may indicate whether UE 115-a supports a TDM pattern for single transmitter operation (e.g., single UL-transmission) associated functionality. If the indication indicates that UE 115-a does not support dynamic power sharing and/or that UE 115-a has single transmitter operation for any band combination (BC), base station 105-a may determine that UE 115-a supports at least one TDM pattern. Otherwise, support may be optional. Some or all other FDD SCells may follow the same timing, which may enable the FDD SCells to act like TDD SCells.

In EN-DC band combinations, if tdm-pattern (e.g., a tdm-pattern associated with a single-uplink or single TDM transmission) is configured, UE 115-a may not be configured with {2, 2} or {2, 7} uplink-downlink configurations, even for LTE FDD cells. In some cases, downlink association indicator (DAI) and/or a HARQ process ID (e.g., a 4-bit HARQ process ID) may be included in the downlink control information (DCI) on UE-specific search spaces (UESS) of FDD cells if UE 115-a is configured with a tdm-pattern. For sTTI, the bitwidth of the HARQ process ID may be the same for TDD and FDD. DAI may be added to the shortened DCI (sDCI), even for FDD cells. Sounding reference signal (SRS) triggering may be supported for TDD cells. For an FDD cell that is configured with a TDM pattern, the SRS triggering field may be omitted or the SRS field may be included in a similar fashion as sDCI on TDD cells.

In some examples, base station 105-a and base station 105-b may coordinate with each other over backhaul link 215. Backhaul link 215 may, for instance, be an example of an Xn or X2 interface and may be wired or wireless. In other examples, base station 105-a and base station 105-b may be independent of each other, and not coordinate across a backhaul link 215, for example due to such link being absent or unavailable, for example where there is high latency on such link.

Base stations 105-a and 105-b and UE 115-a may perform the methods disclosed herein when the CA mode for E-UTRA is TDD+FDD CA and base station 105-a serves a FDD or TDD PCell, or when the CA mode for E-UTRA is TDD+TDD.

Figure 3A:
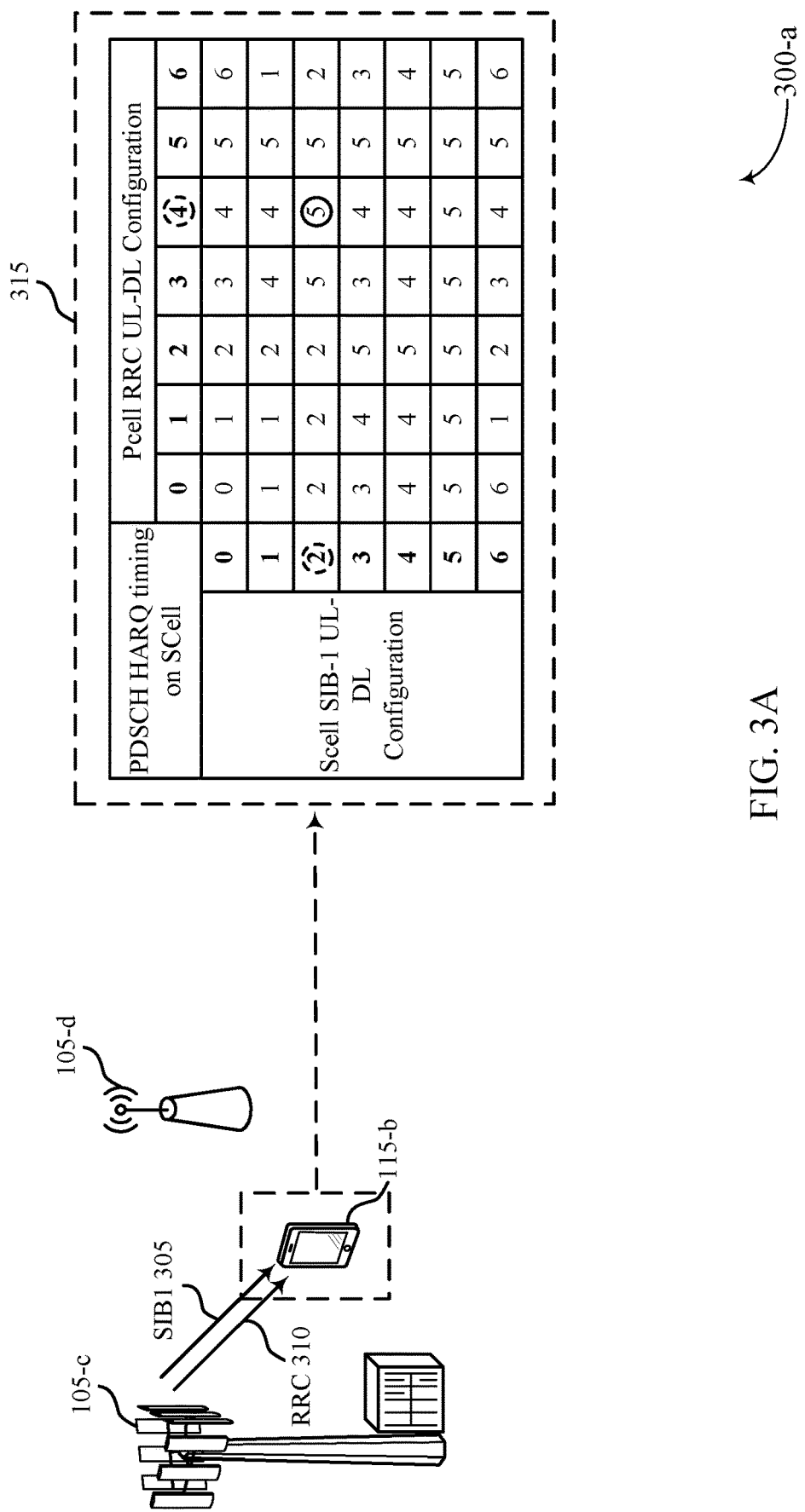
FIGS. 3A and 3B illustrate an example of a secondary cell (SCell) hybrid automatic repeat request (HARQ) procedure that supports single transmitter switching for dual connectivity in accordance with aspects of the present disclosure.
Figure 3B:
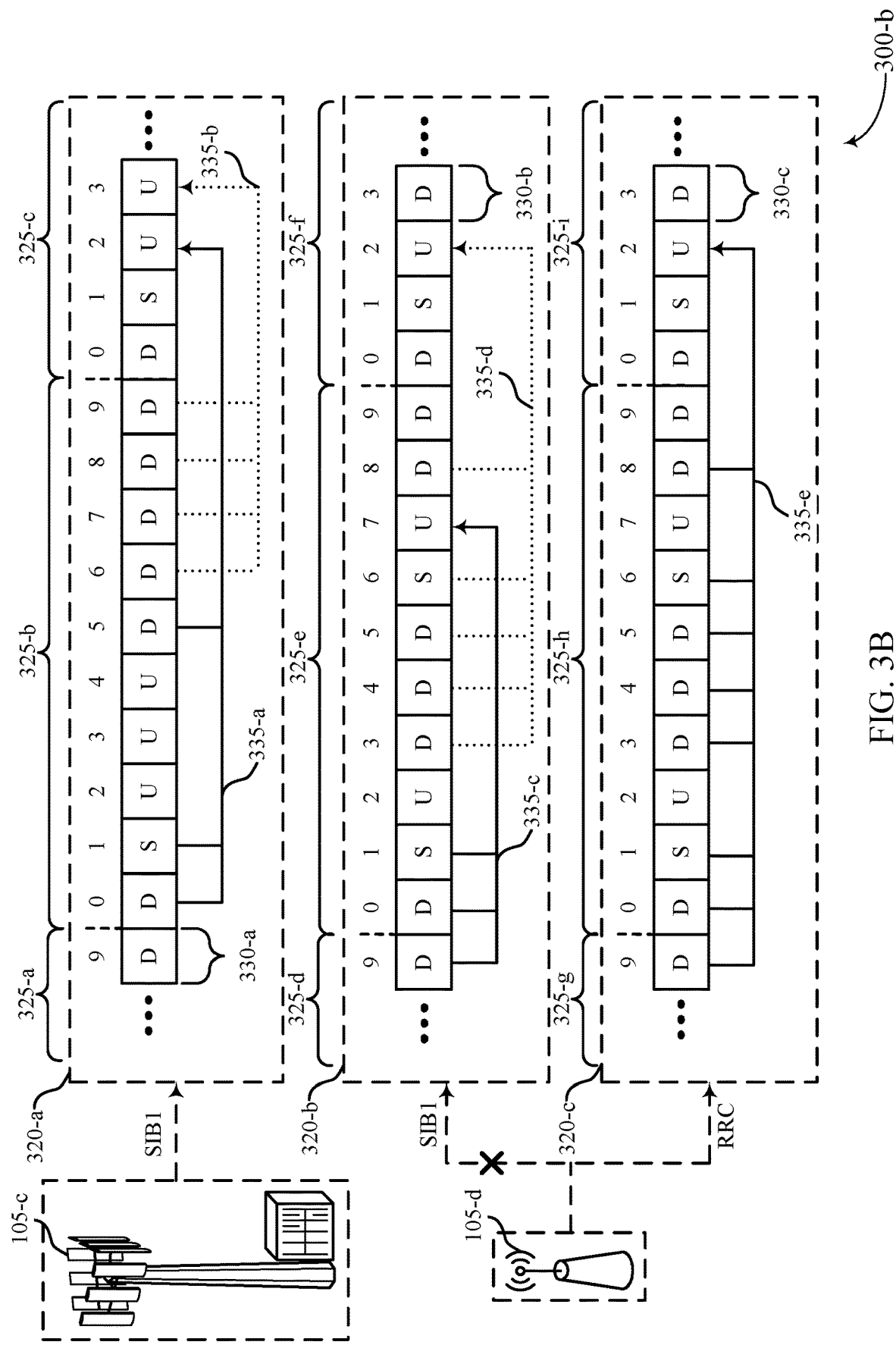

FIGS. 3A and 3B illustrate an example of an SCell HARQ timing procedure 300 that supports single transmitter switching for dual connectivity in accordance with aspects of the present disclosure. In some examples, SCell HARQ timing procedure 300 may implement aspects of wireless communications systems 100 and/or 200. For instance, SCell HARQ timing procedure 300 may include base stations 105-c and 105-d, which may be examples of aspects of base stations 105 as described with reference to FIGS. 1 and/or 2, and UE 115-b, which may be an example of aspects of UEs 115 as described with reference to FIGS. 1 and/or 2.

Base station 105-c may transmit system information 305 (e.g., a system information block type 1 (SIB1)) to UE 115-b. The system information 305 may include an indication of a PCell TDD uplink-downlink configuration (e.g., an uplink-downlink configuration for base station 105-c) and/or an SCell TDD uplink-downlink configuration (e.g., an uplink downlink configuration for base station 105-d). Base station 105-c may also transmit a RRC message 310 to UE 115-b. RRC message 310 may include an indication of a PCell TDD uplink-downlink reference configuration (e.g., an uplink-downlink reference configuration for base station 105-c) which may be different from the SIB1-configured PCell TDD uplink-downlink configuration indicated by system information 305. In some cases, the SIB1-configured PCell TDD uplink-downlink configuration may identify a frame structure configuration for base station 105-c and the RRC-configured PCell TDD uplink-downlink reference configuration may identify which uplink subframes of the frame structure configuration may be used for HARQ-related uplink transmissions (e.g., transmissions of ACKs and/or NACKs).

In some cases, UE 115-*b* may determine an SCell PDSCH HARQ timing for base station 105-*d* based on the SIB1-configured SCell TDD uplink-downlink configuration indicated by system information 305 and the RRC-configured PCell TDD uplink-downlink reference configuration indicated by the RRC message 310. In one example, UE 115-*b* may determine an SCell TDD uplink-downlink reference configuration by comparing (e.g., via table 315) an index of the SIB1-configured SCell TDD uplink-downlink reference configuration with an index of the RCC-configured PCell TDD uplink-downlink configuration. For instance, if the SIB1-configured SCell TDD uplink-downlink configuration index is 2 and the RRC-configured PCell TDD uplink-downlink reference configuration is 4, then the SCell TDD uplink-downlink reference configuration index may be 5. After determining the SCell TDD uplink-downlink reference configuration, UE 115-*a* may determine a PDSCH HARQ timing that follows the SCell TDD uplink-downlink reference configuration. In general, the SIB1-configured SCell TDD uplink-downlink configuration may identify a frame structure configuration for base station 105-*d* and the determined SCell TDD uplink-downlink reference configuration may identify which uplink subframes of the frame structure configuration may be used for HARQ-related uplink transmissions (e.g., transmissions of ACKs and/or NACKs).

Scheduling structure 320-*a* may be an example of scheduling by base station 105-*c*, which may be serving a PCell. Scheduling structure 320-*a* may have one or more frames 325-*a* composed of one or more subframes 330-*a*. For instance, each frame 325 (e.g., frames 325-*a*, 325-*b*, and 325-*c*) of scheduling structure 320-*a* may be composed of 10 subframes 330-*a* which may be indexed from 0 to 9. Each frame 325 of scheduling structure 320-*a* may be configured according to a PCell TDD uplink-downlink configuration (e.g., subframe 0 of frame 325-*b* may be a downlink subframe 330-*a*, subframe 1 of a frame 325-*b* may be a special subframe 330-*a*, and so on) which may be indicated by system information 305. The PCell uplink-downlink configuration may be associated with a particular index (e.g., 3) in a set of preconfigured PCell uplink-downlink configurations.

Additionally, each frame 325 of scheduling structure 320-*a* may have one or more HARQ timings 335. For instance, each frame 325 of scheduling structure 320-*a* may have HARQ timings 335-*a* and 335-*b*. HARQ timings 335 may indicate when ACKs and/or NACKs for downlink and/or special subframes 330-*a* are to be sent for a frame 325. For instance, HARQ timing 335-*a* may indicate that ACKs and/or NACKs for subframes 0, 1 and 5 of a frame 325-*b* are to be sent in subframe 2 of the following frame 325-*c*. Additionally, HARQ timing 335-*b* may indicate that ACKs and/or NACKs for subframes 6-9 are to be sent in subframe 3 of the following frame 325-*c*.

In some cases, HARQ timings 335 of scheduling structure 320-*a* may follow HARQ timings 335 of a PCell TDD uplink-downlink reference configuration, which may be indicated through RRC message 310. The PCell TDD uplink-downlink reference configuration may be associated with an index (e.g., 4) in the set of preconfigured PCell uplink-downlink configurations. In one example, subframe 4 of a frame 325-*b*, where frame 325-*b* may be following a SIB1-indicated PCell uplink-downlink configuration with an index 3, may include NR uplink transmissions. However, an RRC-configured PCell TDD uplink-downlink reference configuration with an index 4 may not include NR uplink transmissions in subframe 4. As such, UE 115-*b* may assume that subframe 4 of frame 325-*b* is to not be used for HARQ-related uplink transmissions and may assume that ACKs and/or NACKS are scheduled to be transmitted on another subframe of frame 325-*b* (e.g., a subframe indicated for uplink transmissions by the RRC-configured PCell TDD uplink-downlink reference configuration that also is also indicated for uplink transmissions within the SIB1-indicated PCell uplink-downlink configuration).

Scheduling structures 320-*b* and 320-*c* may be examples of scheduling by base station 105-*d*, which may serve an SCell. Scheduling structure 320-*b* may have one or more frames 325 (e.g., frames 325-*d*, 325-*e*, and 325-*f*) which may be composed of one or more subframes 330-*b* and scheduling structure 320-*c* may have one or more frames 325 (e.g., frames 325-*g*, 325-*h*, and 325-*i*) which may be composed of one or more subframes 330-*c*. Frames 325 for scheduling structures 320-*b* and 320-*c* may be composed of 10 subframes 330 (e.g., 10 subframes 330-*b* for frames 325 of scheduling structure 320-*b* and 10 subframes 330-*c* for frames 325 of scheduling structure 320-*c*). Each frame 325 of scheduling structures 320-*b* and 320-*c* may be configured according to an SCell TDD uplink-downlink configuration (e.g., subframe 0 of frames 325-*e* and 325-*h* may be a downlink subframe 330 and subframe 1 of frames 325-*e* and 325-*h* may be a special subframe 330) which may be indicated by system information 305. The frame structure configurations of scheduling structure 320-*b* may be the same as the frame structure configurations of scheduling structure 320-*c*. The SCell TDD uplink-downlink configuration may be associated with a particular index (e.g., 2) in a set of preconfigured SCell TDD uplink-downlink configurations.

Additionally, each frame 325 (e.g., frames 325 of both scheduling structure 320-*b* and 320-*c*) may have one or more HARQ timings 335. For instance, frames 325 of scheduling structure 320-*b* may have HARQ timings 335-*c* and 335-*d* and frames 325 of scheduling structure 320-*c* may have HARQ timing 335-*e*. HARQ timings 335 may indicate when ACKs and/or NACKs for downlink and/or special subframes 330 are to be sent in frames 325 of scheduling structures 320-*b* and 320-*c*. HARQ timings 335-*c* and 335-*d* may be HARQ timings 335 associated with the SIB1-indicated SCell TDD uplink-downlink configuration and HARQ timing 335-*e* may be a HARQ timing 335 associated with a SCell TDD uplink-downlink reference configuration. The SCell uplink-downlink reference configuration index (e.g., 5), which may be an index in the set of preconfigured SCell uplink-downlink configurations, may be determined via table 315 by comparing the index of the SCell TDD uplink-downlink configuration (e.g., 2) with the index of the PCell uplink-downlink reference configuration (e.g., 4).

Based on receiving the RRC message 310, UE 115-*b* may assume that base station 105-*d* is to use scheduling structure 320-*c* for HARQ transmissions in uplink subframes, and not scheduling structure 320-*b*. In some cases, UE 115-*b* may attempt to perform an NR uplink transmission on subframe 7 of a frame 325 associated with base station 105-*d*. Using scheduling structure 320-*c* may prevent UE 115-*b* from assuming that LTE uplink HARQ transmissions are to be scheduled on subframe 7 (e.g., which may be utilized by HARQ timing 335-*d*) by aggregating the ACKs or NACKs that may be sent on subframe 7 of a frame 325-*b* (e.g., ACKs and/or NACKs corresponding to downlink transmissions on subframes 0, 9, and 1) into subframe 2 of frame 325-*c*.

Figure 4:
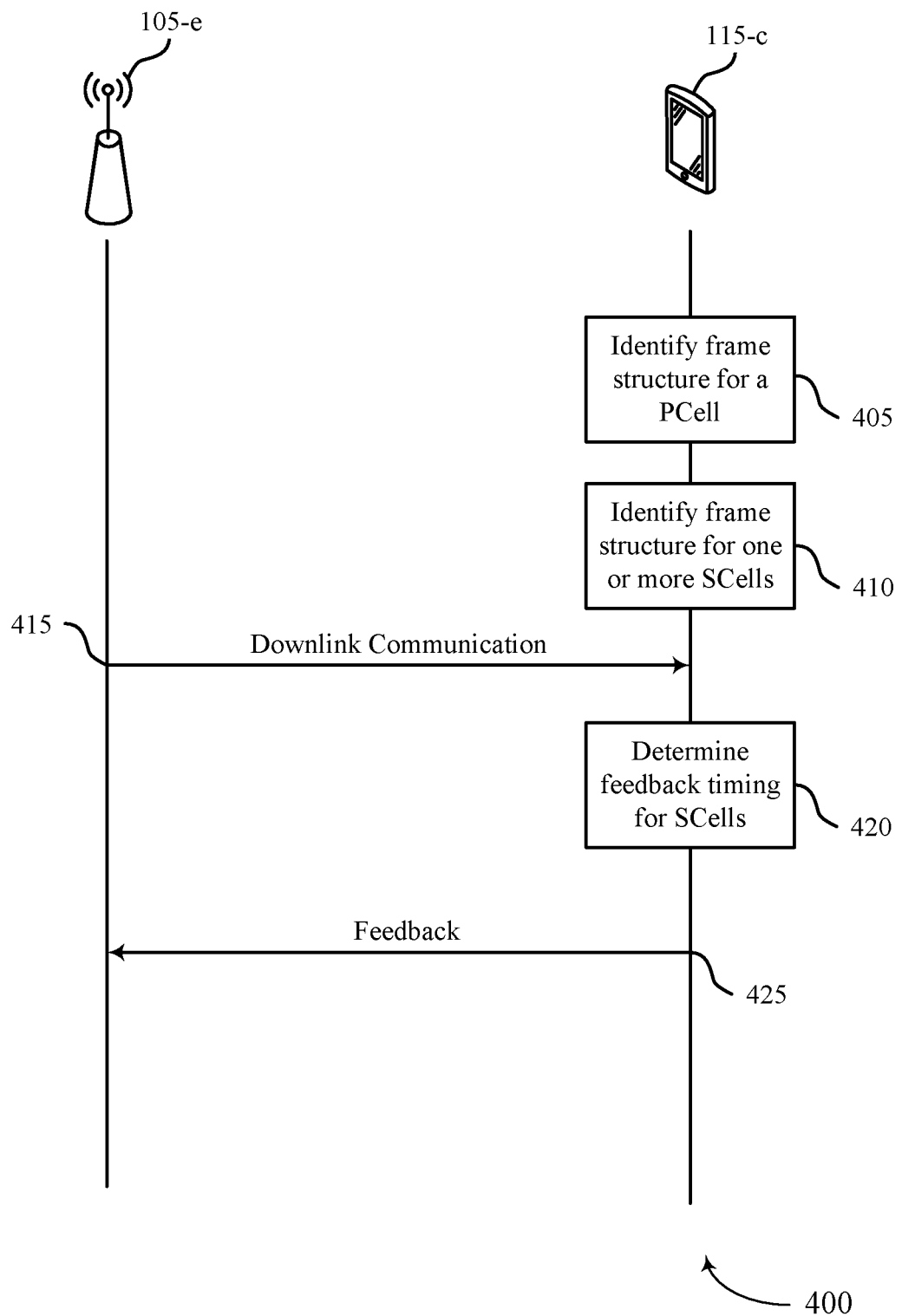
FIG. 4 illustrates an example of a process flow that supports single transmitter switching for dual connectivity in accordance with aspects of the present disclosure.

FIG. 4 illustrates an example of a process flow 400 that supports single transmitter switching for dual connectivity in accordance with aspects of the present disclosure. In some examples, process flow 400 may implement aspects of wireless communications systems 100 and/or 200. For instance, SCell HARQ timing procedure may include base station 105-e, which may be an example of aspects of a base station 105 as described with reference to FIGS. 1 and/or 2, and UE 115-b, which may be an example of aspects of UEs 115 as described with reference to FIGS. 1 and/or 2.

At 405, UE 115-c may identify, for a CA configuration including a PCell and one or more SCells, a first frame structure configuration (e.g., a reference PCell uplink-downlink configuration) for the PCell. In some cases, UE 115-c may receive an indication (e.g., a SIB1 from a PCell) of the first frame structure configuration for the PCell, where the received indication may identify at least one uplink TTI of the PCell for transmitting feedback (e.g., transmitting feedback to base station 105-e). In some cases, receiving the indication of the first frame structure configuration includes receiving RRC signaling including the indication of the first frame structure configuration.

At 410, UE 115-c may identify a second frame structure configuration (e.g., a non-reference SCell uplink-downlink configuration) for the SCell. In some cases, UE 115-c may receive an indication (e.g., system information such as SIB1 from the PCell) of the second frame structure configuration for the SCell, where the received indication may identify at least one uplink TTI of the SCell for downlink communication from base station 105-e.

At 415, base station 105-e may transmit a downlink communication (e.g., one or more PDSCHs) on the SCell. UE 115-a may receive the downlink communication on the SCell.

At 420, UE 115-c may determine a feedback timing (e.g., a PDSCH HARQ timing) for the SCell based on the first frame structure configuration for the PCell and the second frame structure for the SCell. UE 115-a may identify a third frame structure configuration (e.g., a reference SCell uplink-downlink configuration) and may determine the feedback timing according to the identified third frame structure configuration. In some cases, UE 115-c may map a first indicator of the first frame structure (e.g., an index of the reference PCell uplink-downlink configuration) and a second indicator of the second frame structure configuration (e.g., an index of the non-reference SCell uplink-downlink configuration) to a third indicator of the third frame structure configuration (e.g., an index of reference SCell uplink-downlink configuration). The third frame structure configuration may be different or the same as at least one of the first frame structure configuration and the second frame structure configuration.

At 425, UE 115-c may transmit feedback according to the determined feedback timing. UE 115-c may transmit the feedback in response to the received downlink communication. Base station 105-e may receive the feedback.

Figure 5:
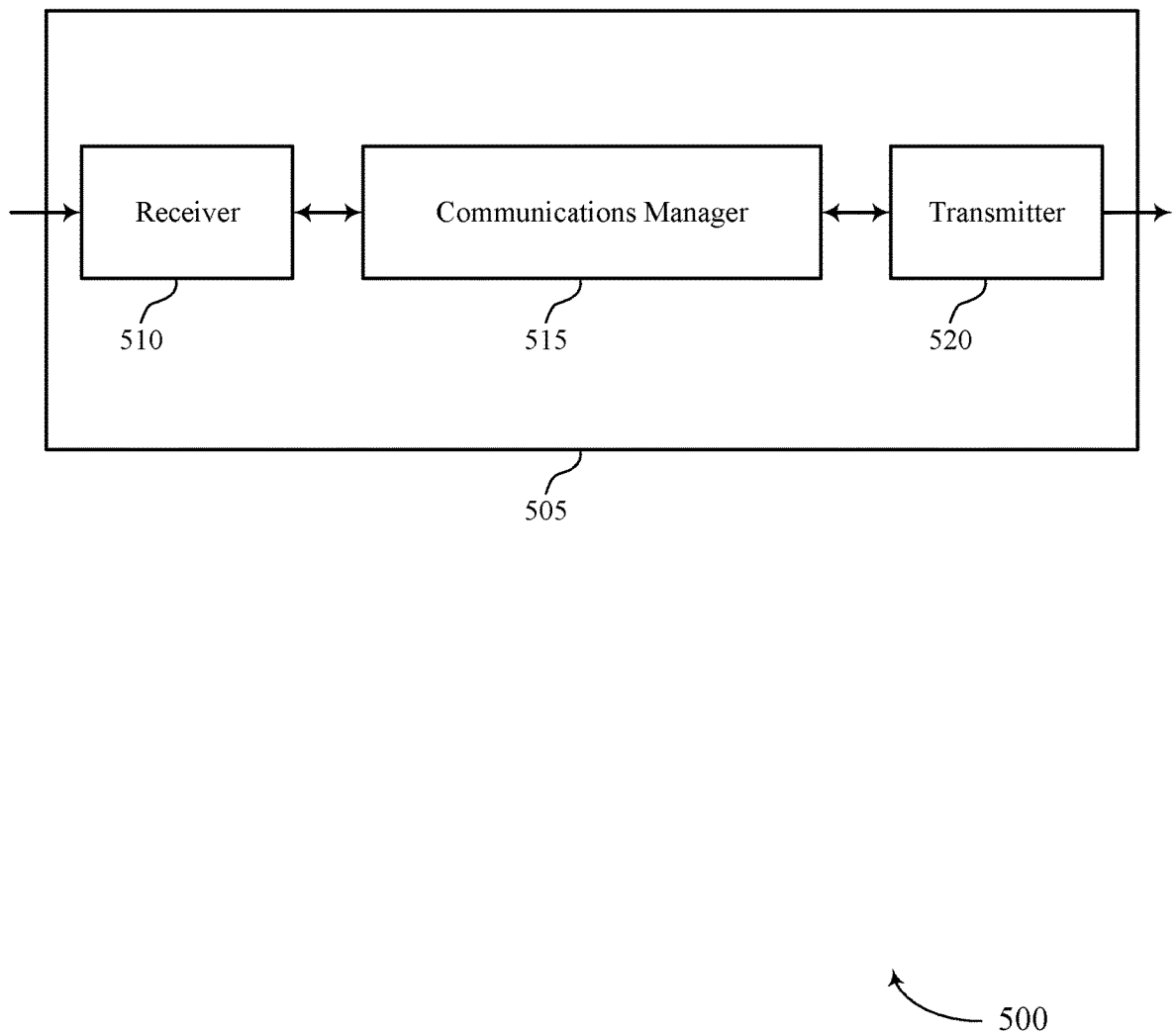
FIGS. 5 and 6 show block diagrams of devices that support single transmitter switching for dual connectivity in accordance with aspects of the present disclosure.

FIG. 5 shows a block diagram 500 of a device 505 that supports single transmitter switching for dual connectivity in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to single transmitter switching for EN-DC, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify, for a CA configuration including a PCell and one or more secondary cells, a first frame structure configuration for the PCell and a second frame structure configuration for a secondary cell of the one or more secondary cells, receive, from a base station, a downlink communication on the secondary cell, determine a feedback timing for the secondary cell based on the first frame structure configuration for the PCell and the second frame structure configuration for the secondary cell, and transmit, in response to the received downlink communication, feedback to the base station according to the determined feedback timing. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
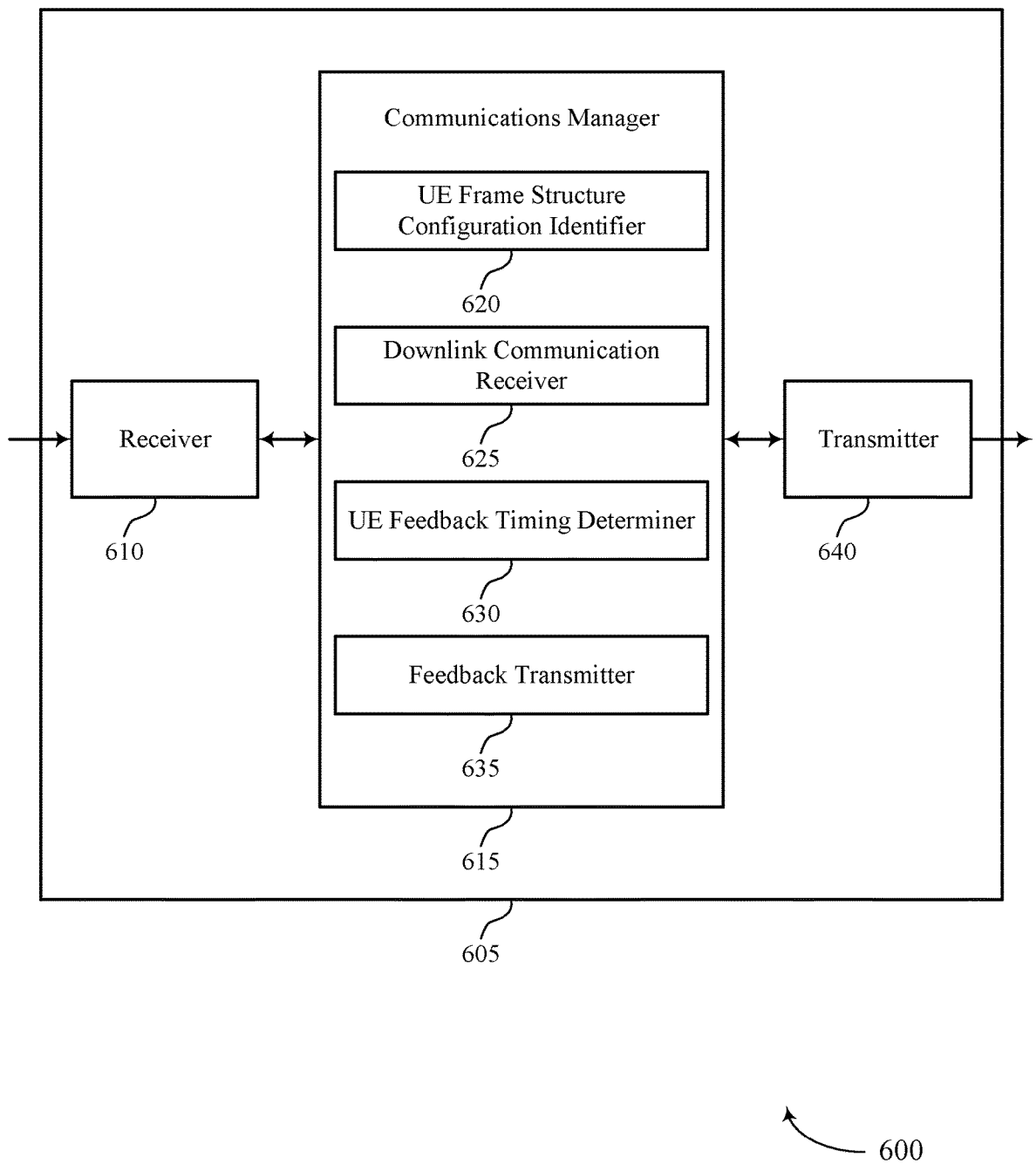

FIG. 6 shows a block diagram 600 of a device 605 that supports single transmitter switching for dual connectivity in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to single transmitter switching for dual connectivity, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an UE frame structure configuration identifier 620, a downlink communication receiver 625, an UE feedback timing determiner 630, and a feedback transmitter 635. The communications manager 615 may be an example of aspects of the communications manager 810 described herein.

The UE frame structure configuration identifier 620 may identify, for a carrier aggregation configuration including a PCell and one or more SCells, a first frame structure configuration for the PCell and a second frame structure configuration for an SCell of the one or more SCells.

The downlink communication receiver 625 may receive, from a base station, a downlink communication on the SCell.

The UE feedback timing determiner 630 may determine a feedback timing for the SCell based on the first frame structure configuration for the PCell and the second frame structure configuration for the SCell.

The feedback transmitter 635 may transmit, in response to the received downlink communication, feedback to the base station according to the determined feedback timing.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
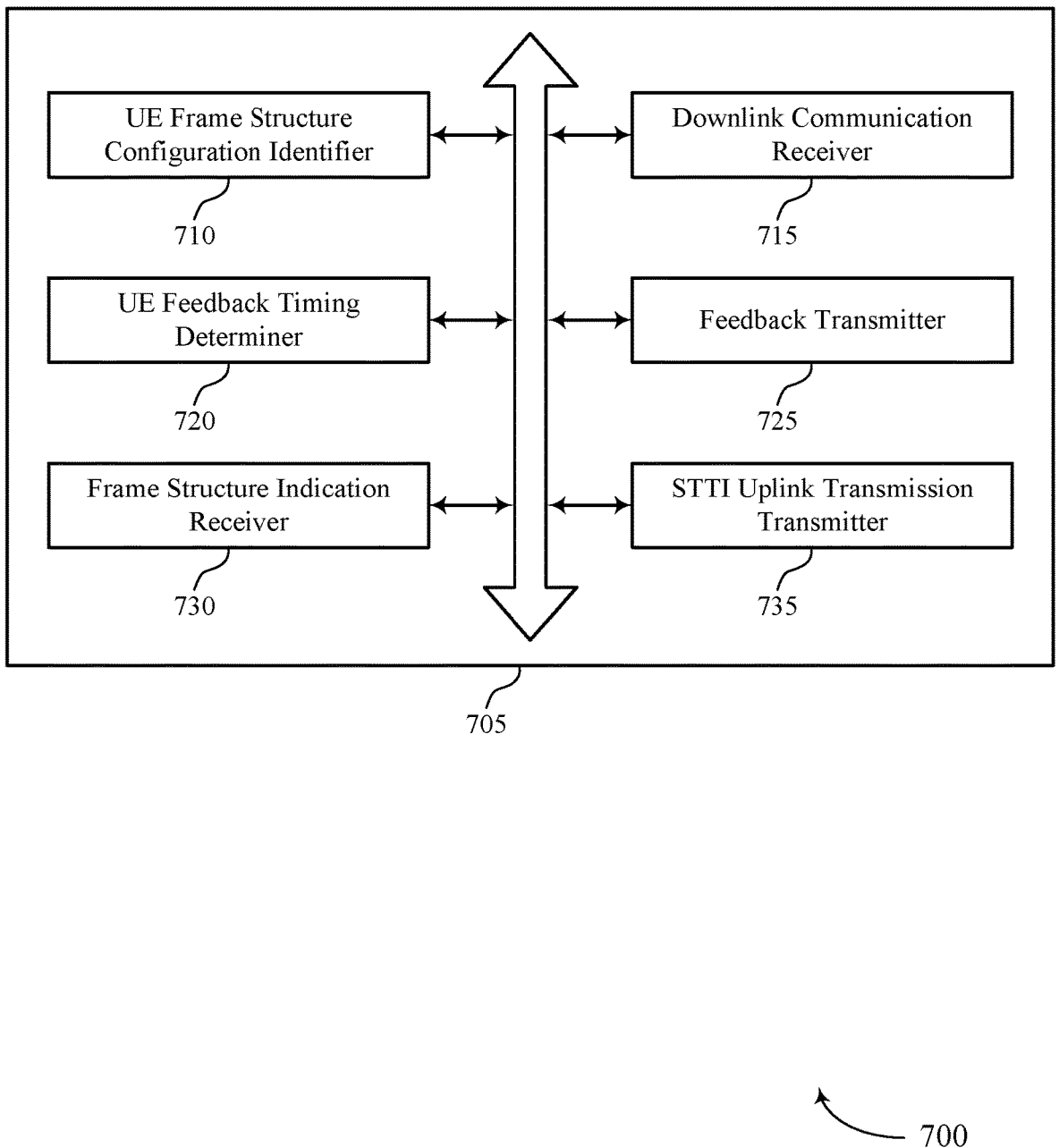
FIG. 7 shows a block diagram of a communications manager that supports single transmitter switching for dual connectivity in accordance with aspects of the present disclosure.

FIG. 7 shows a block diagram 700 of a communications manager 705 that supports single transmitter switching for dual connectivity in accordance with aspects of the present disclosure. The communications manager 705 may be an example of aspects of a communications manager 515, a communications manager 615, or a communications manager 810 described herein. The communications manager 705 may include an UE frame structure configuration identifier 710, a downlink communication receiver 715, an UE feedback timing determiner 720, a feedback transmitter 725, a frame structure indication receiver 730, and a sTTI uplink transmission transmitter 735. Each of these modules may communicate, directly or indirectly, with one another (e.g., via one or more buses).

The UE frame structure configuration identifier 710 may identify, for a carrier aggregation configuration including a PCell and one or more SCells, a first frame structure configuration for the PCell and a second frame structure configuration for a SCell of the one or more SCells. In some examples, the UE frame structure configuration identifier 710 may identify a third frame structure configuration based on the first frame structure configuration and the second frame structure configuration. In some examples, the UE frame structure configuration identifier 710 may map a first indicator of the first frame structure configuration and a second indicator of the second frame structure configuration to a third indicator of the third frame structure configuration. In some examples, the UE frame structure configuration identifier 710 may receive an indication of a time division multiplexing pattern. In some cases, the third frame structure configuration is a different frame structure configuration than the first frame structure configuration and the second frame structure configuration. In some cases, the third frame structure configuration is a same frame structure configuration as the first frame structure configuration or the second frame structure configuration. In some cases, the PCell operates according to a frequency division duplexing mode or a time division duplexing mode. In some cases, the SCell operates according to the time division duplexing mode. In some cases, the carrier aggregation configuration includes a dual connectivity configuration including a MCG and a SCG, the PCell in the MCG and the secondary cell in the SCG. In some cases, the MCG operates according to a first radio access technology, and the SCG operates according to a second radio access technology. In some cases, the UE is configured for single transmitter operation.

The downlink communication receiver 715 may receive, from a base station, a downlink communication on the SCell.

The UE feedback timing determiner 720 may determine a feedback timing for the SCell based on the first frame structure configuration for the PCell and the second frame structure configuration for the SCell. In some examples, the UE feedback timing determiner 720 may determine the feedback timing according to the identified third frame structure configuration. In some examples, the UE feedback timing determiner 720 may determine a feedback timing for the PCell based on the first frame structure configuration for the PCell and the third frame structure configuration for the PCell.

The feedback transmitter 725 may transmit, in response to the received downlink communication, feedback to the base station according to the determined feedback timing.

The frame structure indication receiver 730 may receive an indication of the second frame structure configuration for the SCell, the received indication of the second frame structure configuration identifying at least one uplink TTI of the SCell for the downlink communication from the base station, where the second frame structure configuration is identified based on the received indication of the second frame structure configuration. In some examples, the frame structure indication receiver 730 may receive system information including the indication of the second frame structure configuration. In some examples, the frame structure indication receiver 730 may receive an indication of the first frame structure configuration for the PCell, the received indication of the first frame structure configuration identifying at least one uplink TTI of the PCell for feedback in response to downlink communications from the base station, where the first frame structure configuration is identified based on the received indication of the first frame structure configuration. In some examples, the SCell may operate according to a FDD mode. In some examples, the PCell may operate according to a TDD mode. In other examples, the SCell may operate according to the FDD mode and the SCell may operate according to the TDD mode. In some examples, the frame structure indication receiver 730 may receive an indication of a third frame structure configuration for the PCell, the third frame structure configuration identifying at least one downlink TTI for downlink communications from the base station on the PCell. In some examples, the frame structure indication receiver 730 may receive system information including the indication of the third frame structure configuration. In some examples, the frame structure indication receiver 730 may receive radio resource control signaling including the indication of the first frame structure configuration.

The sTTI uplink transmission transmitter 735 may transmit, according to the time division multiplexing pattern, an uplink transmission using a shortened TTI on the SCell, the SCell configured to operate according to a frequency division duplexing mode.

Figure 8:
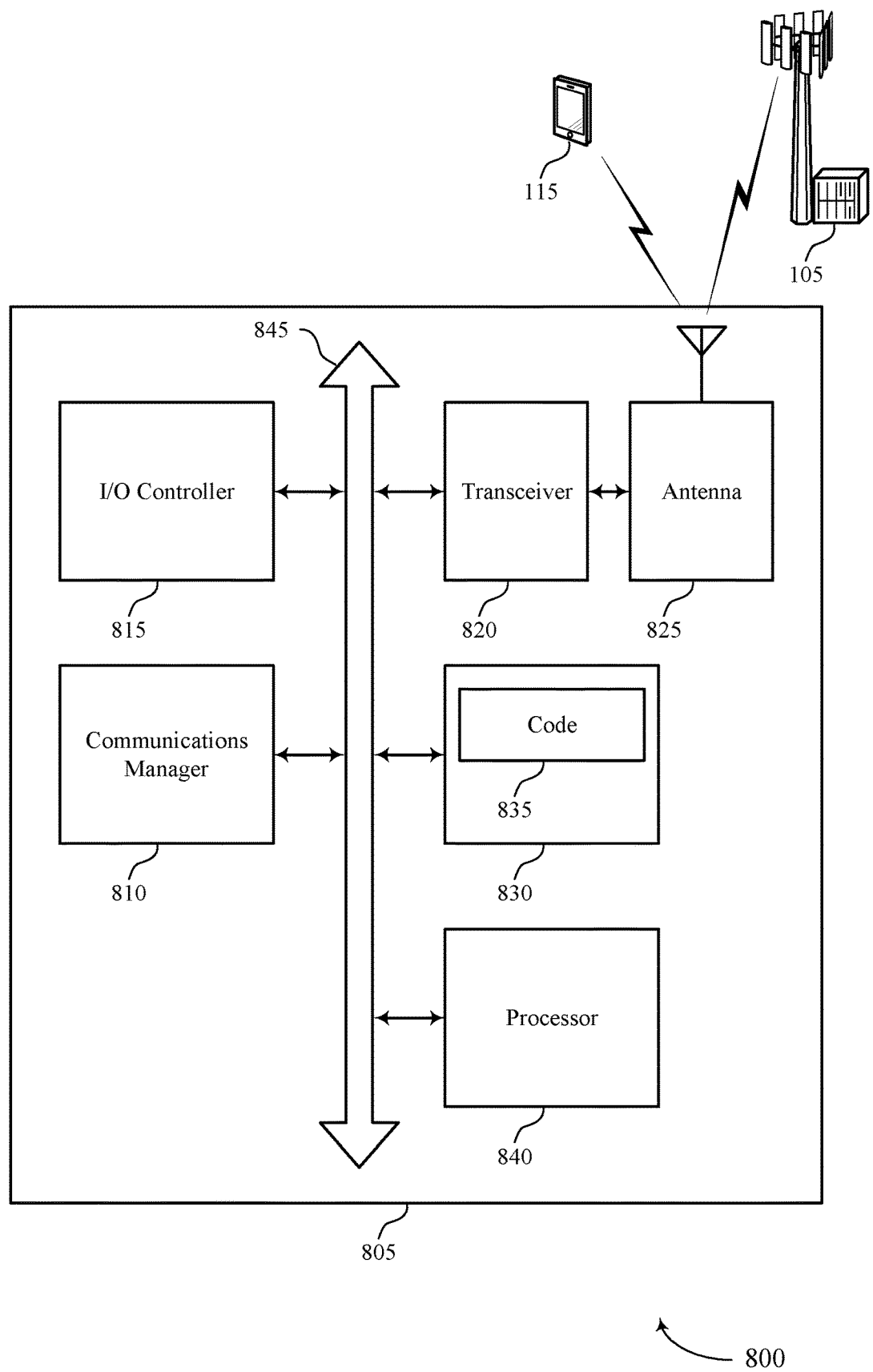
FIG. 8 shows a diagram of a system including a device that supports single transmitter switching for dual connectivity in accordance with aspects of the present disclosure.

FIG. 8 shows a diagram of a system 800 including a device 805 that supports single transmitter switching for dual connectivity in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify, for a carrier aggregation configuration including a PCell and one or more SCells, a first frame structure configuration for the PCell and a second frame structure configuration for a SCell of the one or more SCells, receive, from a base station, a downlink communication on the SCell, determine a feedback timing for the SCell based on the first frame structure configuration for the PCell and the second frame structure configuration for the SCell, and transmit, in response to the received downlink communication, feedback to the base station according to the determined feedback timing. In some cases, the communications manager 810 may receive an indication of the first frame structure configuration and/or of a third frame structure configuration of the PCell via RRC signaling. The received indication may identify at least one uplink TTI of the PCell for feedback in response to downlink communications from the base station. If the RRC signaling includes the indication of the third frame structure configuration, the communications manager 810 may determine the feedback timing for the SCell based on the third frame structure configuration. The PCell may operate according to a TDD mode, the SCell may operate according to an FDD mode, or both.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting single transmitter switching for dual connectivity).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
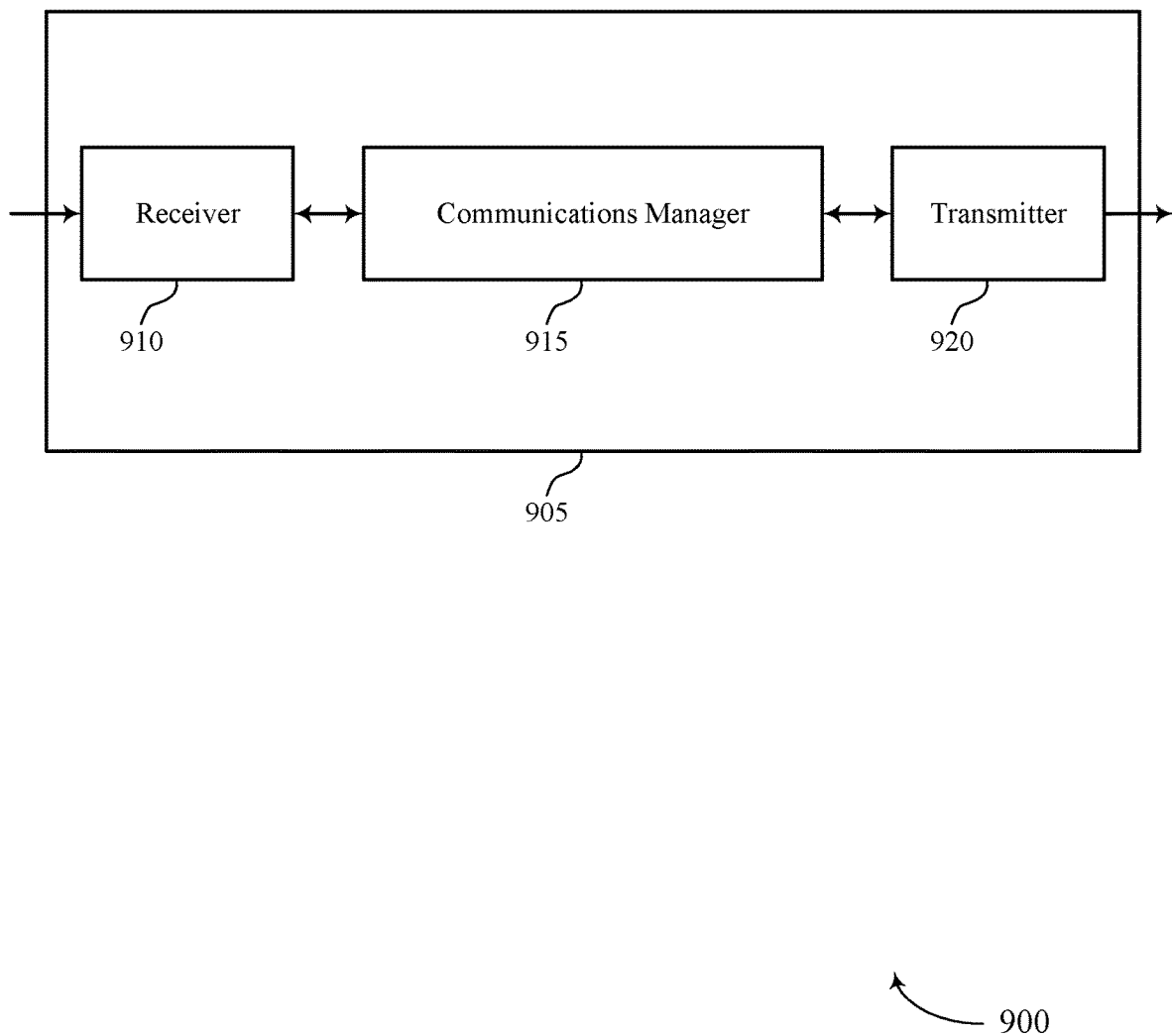
FIGS. 9 and 10 show block diagrams of devices that support single transmitter switching for dual connectivity in accordance with aspects of the present disclosure.

FIG. 9 shows a block diagram 900 of a device 905 that supports single transmitter switching for dual connectivity in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to single transmitter switching for dual connectivity, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a carrier aggregation configuration including a PCell and one or more SCells, a first frame structure configuration for the PCell being different from a second frame structure configuration for a SCell of the one or more SCells, determine a feedback timing for the SCell based on the first frame structure configuration for the PCell and the second frame structure configuration for the SCell, transmit, to a UE, a downlink communication on the SCell, and receive, in response to the transmitted downlink communication, feedback from the UE according to the determined feedback timing. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
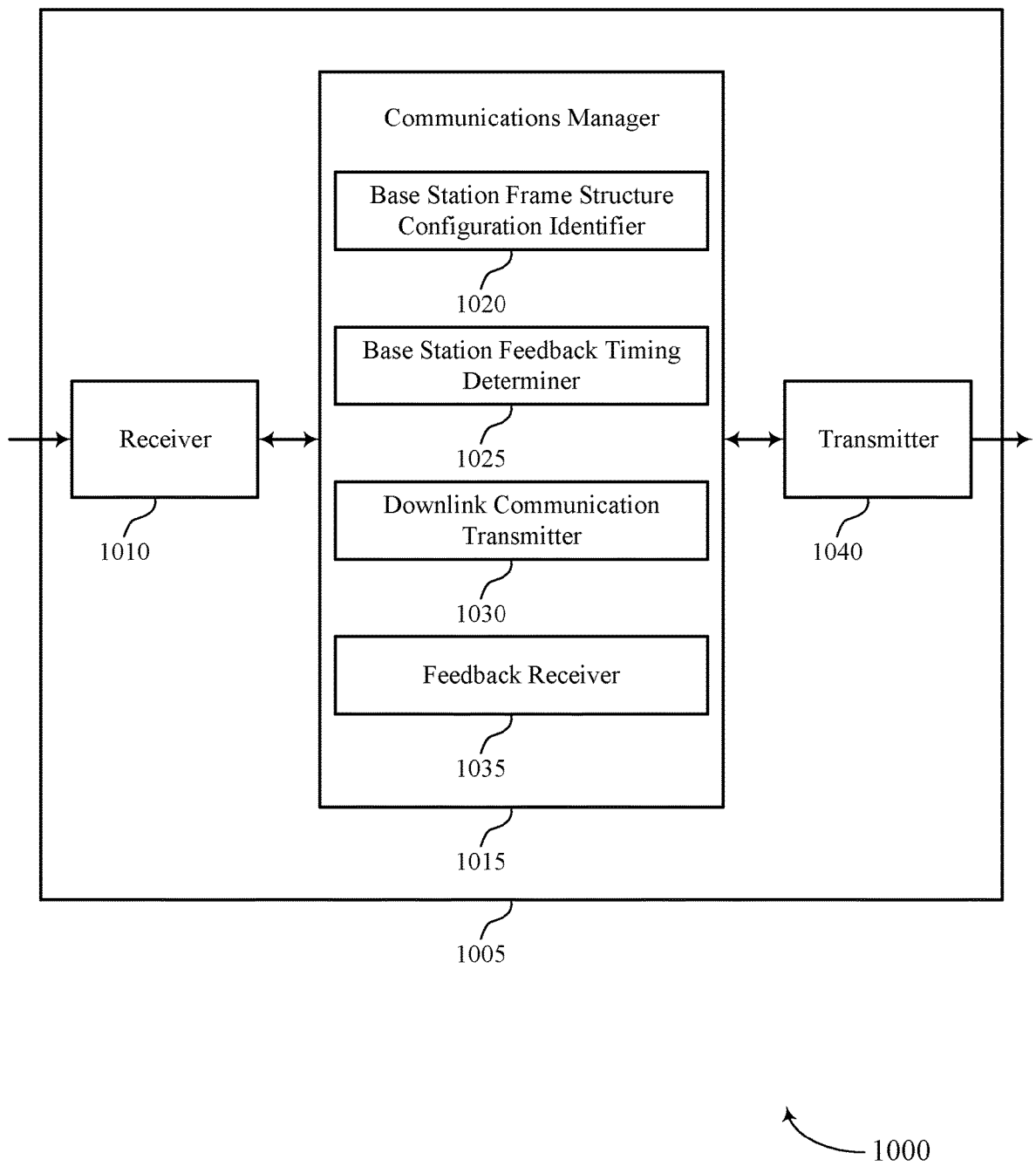

FIG. 10 shows a block diagram 1000 of a device 1005 that supports single transmitter switching for dual connectivity in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to single transmitter switching for dual connectivity, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a base station frame structure configuration identifier 1020, a base station feedback timing determiner 1025, a downlink communication transmitter 1030, and a feedback receiver 1035. The communications manager 1015 may be an example of aspects of the communications manager 1210 described herein.

The base station frame structure configuration identifier 1020 may identify a carrier aggregation configuration including a PCell and one or more SCells, a first frame structure configuration for the PCell being different from a second frame structure configuration for a SCell of the one or more SCells.

The base station feedback timing determiner 1025 may determine a feedback timing for the SCell based on the first frame structure configuration for the PCell and the second frame structure configuration for the SCell.

The downlink communication transmitter 1030 may transmit, to a UE, a downlink communication on the SCell.

The feedback receiver 1035 may receive, in response to the transmitted downlink communication, feedback from the UE according to the determined feedback timing.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
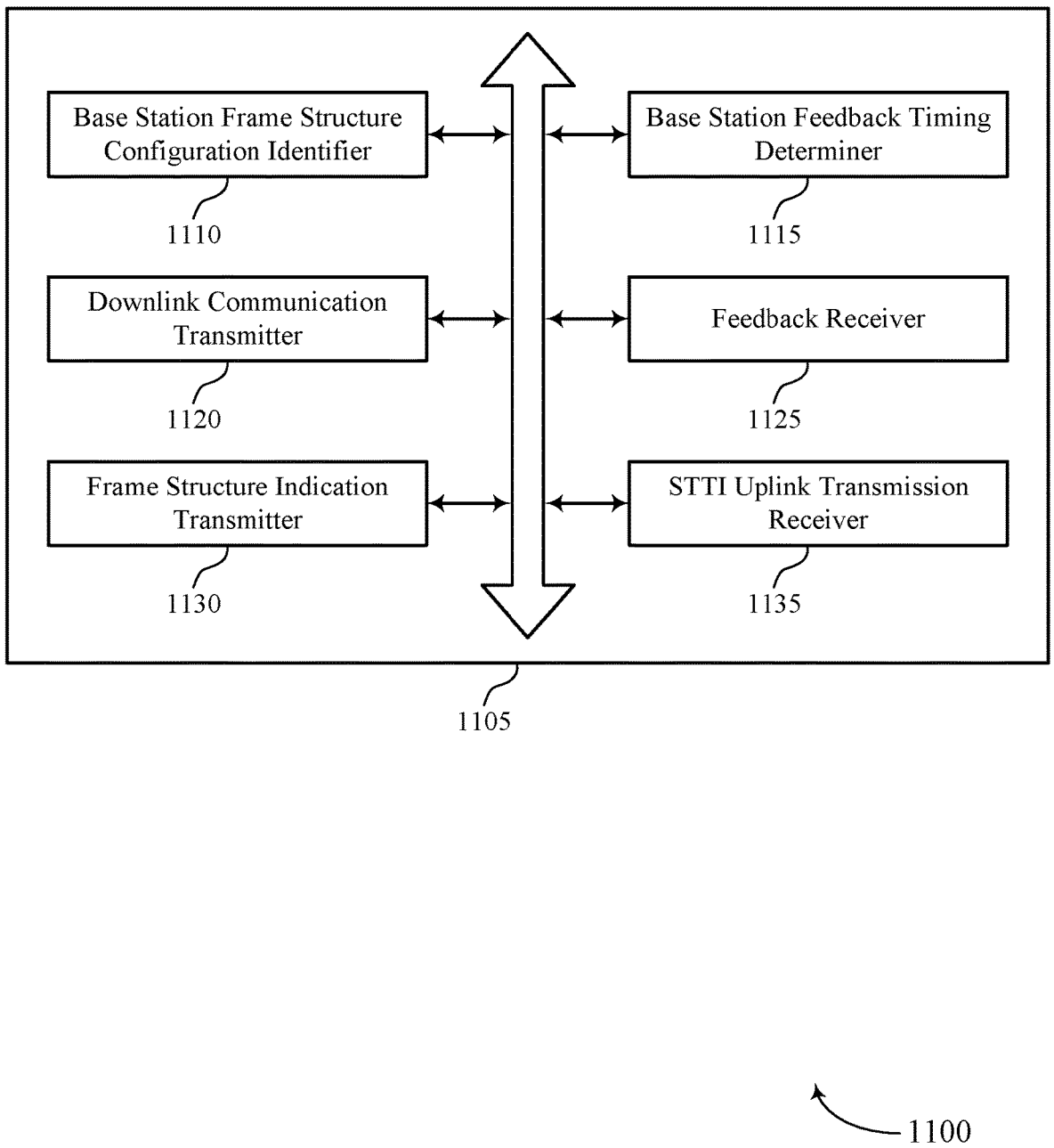
FIG. 11 shows a block diagram of a communications manager that supports single transmitter switching for dual connectivity in accordance with aspects of the present disclosure.

FIG. 11 shows a block diagram 1100 of a communications manager 1105 that supports single transmitter switching for dual connectivity in accordance with aspects of the present disclosure. The communications manager 1105 may be an example of aspects of a communications manager 915, a communications manager 1015, or a communications manager 1210 described herein. The communications manager 1105 may include a base station frame structure configuration identifier 1110, a base station feedback timing determiner 1115, a downlink communication transmitter 1120, a feedback receiver 1125, a frame structure indication transmitter 1130, and a sTTI uplink transmission receiver 1135. Each of these modules may communicate, directly or indirectly, with one another (e.g., via one or more buses).

The base station frame structure configuration identifier 1110 may identify a carrier aggregation configuration including a PCell and one or more SCells, a first frame structure configuration for the PCell being different from a second frame structure configuration for a SCell of the one or more SCells. In some examples, the base station frame structure configuration identifier 1110 may identify a third frame structure configuration based on the first frame structure configuration and the second frame structure configuration. In some examples, the base station frame structure configuration identifier 1110 may map a first indicator of the first frame structure configuration and a second indicator of the second frame structure configuration to a third indicator of the third frame structure configuration. In some cases, the third frame structure configuration is a different frame structure configuration than the first frame structure configuration and the second frame structure configuration. In some cases, the third frame structure configuration is a same frame structure configuration as the first frame structure configuration or the second frame structure configuration. In some cases, the PCell operates according to a frequency division duplexing mode or a time division duplexing mode. In some cases, the SCell operates according to the time division duplexing mode. In some cases, the carrier aggregation configuration includes a dual connectivity configuration including a MCG and a SCG, the PCell in the MCG and the secondary cell in the SCG. In some cases, the MCG operates according to a first radio access technology, and the SCG operates according to a second radio access technology. In some cases, the UE is configured for single transmitter operation.

The base station feedback timing determiner 1115 may determine a feedback timing for the SCell based on the first frame structure configuration for the PCell and the second frame structure configuration for the SCell. In some examples, the base station feedback timing determiner 1115 may determine the feedback timing according to the identified third frame structure configuration. In some examples, the base station feedback timing determiner 1115 may determine a feedback timing for the PCell based on the first frame structure configuration for the PCell and the third frame structure configuration for the PCell.

The downlink communication transmitter 1120 may transmit, to a UE, a downlink communication on the SCell.

The feedback receiver 1125 may receive, in response to the transmitted downlink communication, feedback from the UE according to the determined feedback timing.

The frame structure indication transmitter 1130 may transmit an indication of the second frame structure configuration for the SCell, the transmitted indication of the second frame structure configuration identifying at least one uplink TTI of the SCell for the downlink communication to the UE, where the second frame structure configuration is identified based on the indication of the second frame structure configuration. In some examples, the frame structure indication transmitter 1130 may transmit system information including the indication of the second frame structure configuration. In some examples, the frame structure indication transmitter 1130 may transmit an indication of the first frame structure configuration for the PCell, the transmitted indication of the first frame structure configuration identifying at least one uplink TTI of the PCell for feedback in response to downlink communications from the base station, where the first frame structure configuration is identified based on the transmitted indication of the first frame structure configuration. In some examples, the SCell may operate according to a FDD mode. In some examples, the PCell may operate according to a TDD mode. In other examples, the SCell may operate according to the FDD mode and the SCell may operate according to the TDD mode. In some examples, the frame structure indication transmitter 1130 may transmit an indication of a third frame structure configuration for the PCell, the third frame structure configuration identifying at least one downlink TTI for downlink communications from the base station on the PCell. In some examples, the frame structure indication transmitter 1130 may transmit system information including the indication of the third frame structure configuration. In some examples, the frame structure indication transmitter 1130 may transmit radio resource control signaling including the indication of the first frame structure configuration. In some examples, the frame structure indication transmitter 1130 may transmit an indication of a time division multiplexing pattern.

The sTTI uplink transmission receiver 1135 may receive, according to the time division multiplexing pattern, an uplink transmission using a shortened TTI on the SCell, the SCell configured to operate according to a frequency division duplexing mode.

Figure 12:
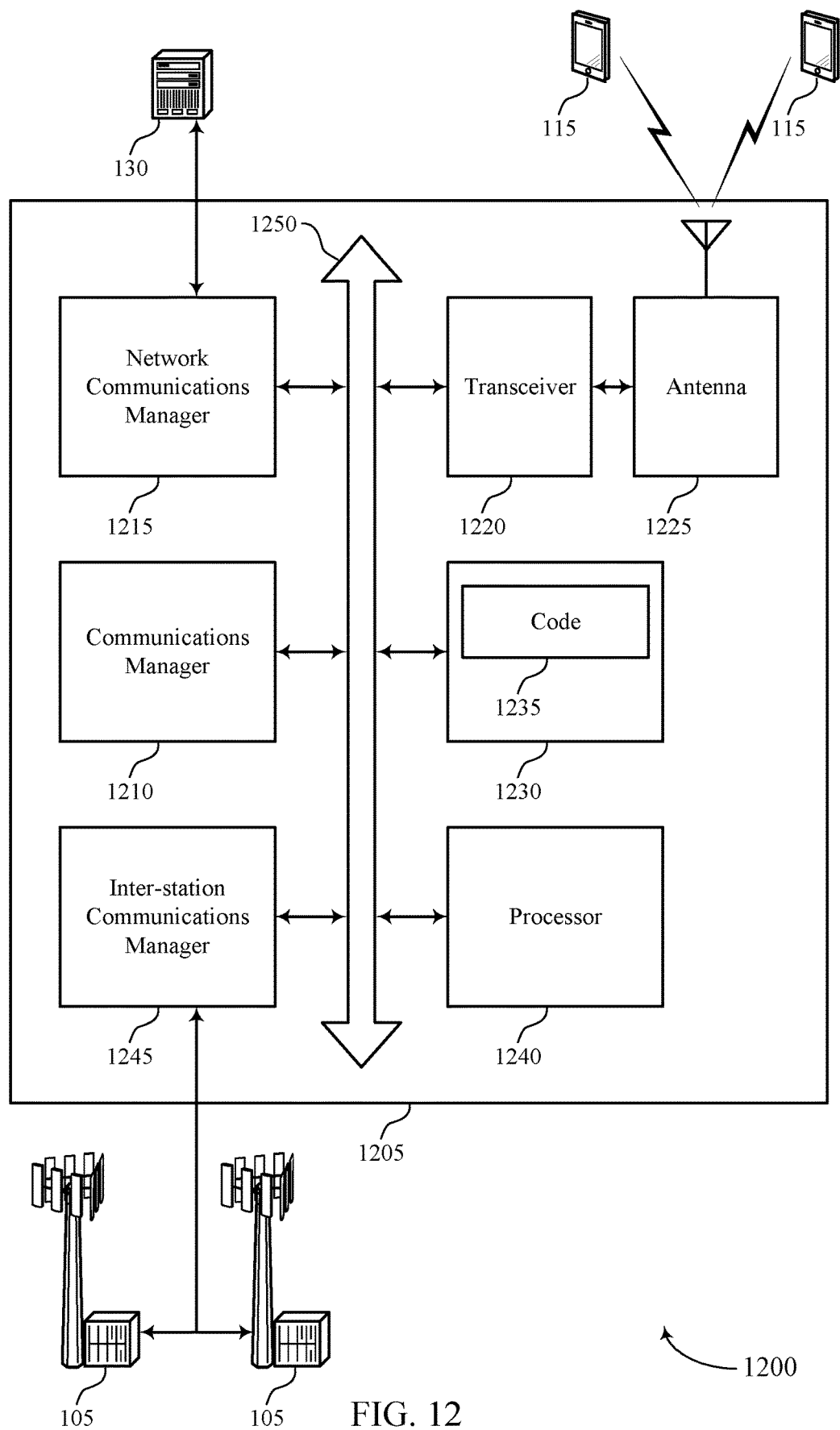
FIG. 12 shows a diagram of a system including a device that supports single transmitter switching for dual connectivity in accordance with aspects of the present disclosure.

FIG. 12 shows a diagram of a system 1200 including a device 1205 that supports single transmitter switching for dual connectivity in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a carrier aggregation configuration including a PCell and one or more SCells, a first frame structure configuration for the PCell being different from a second frame structure configuration for a SCell of the one or more SCells, determine a feedback timing for the SCell based on the first frame structure configuration for the PCell and the second frame structure configuration for the SCell, transmit, to a UE, a downlink communication on the SCell, and receive, in response to the transmitted downlink communication, feedback from the UE according to the determined feedback timing. In some cases, the communications manager 1110 may transmit an indication of the first frame structure configuration and/or of a third frame structure configuration of the PCell via RRC signaling. The transmitted indication may identify at least one uplink TTI of the PCell for feedback in response to downlink communications from the base station. If the RRC signaling includes the indication of the third frame structure configuration, the communications manager 1110 may determine the feedback timing for the SCell based on the third frame structure configuration. The PCell may operate according to a TDD mode, the SCell may operate according to an FDD mode, or both.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting single transmitter switching for dual connectivity).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
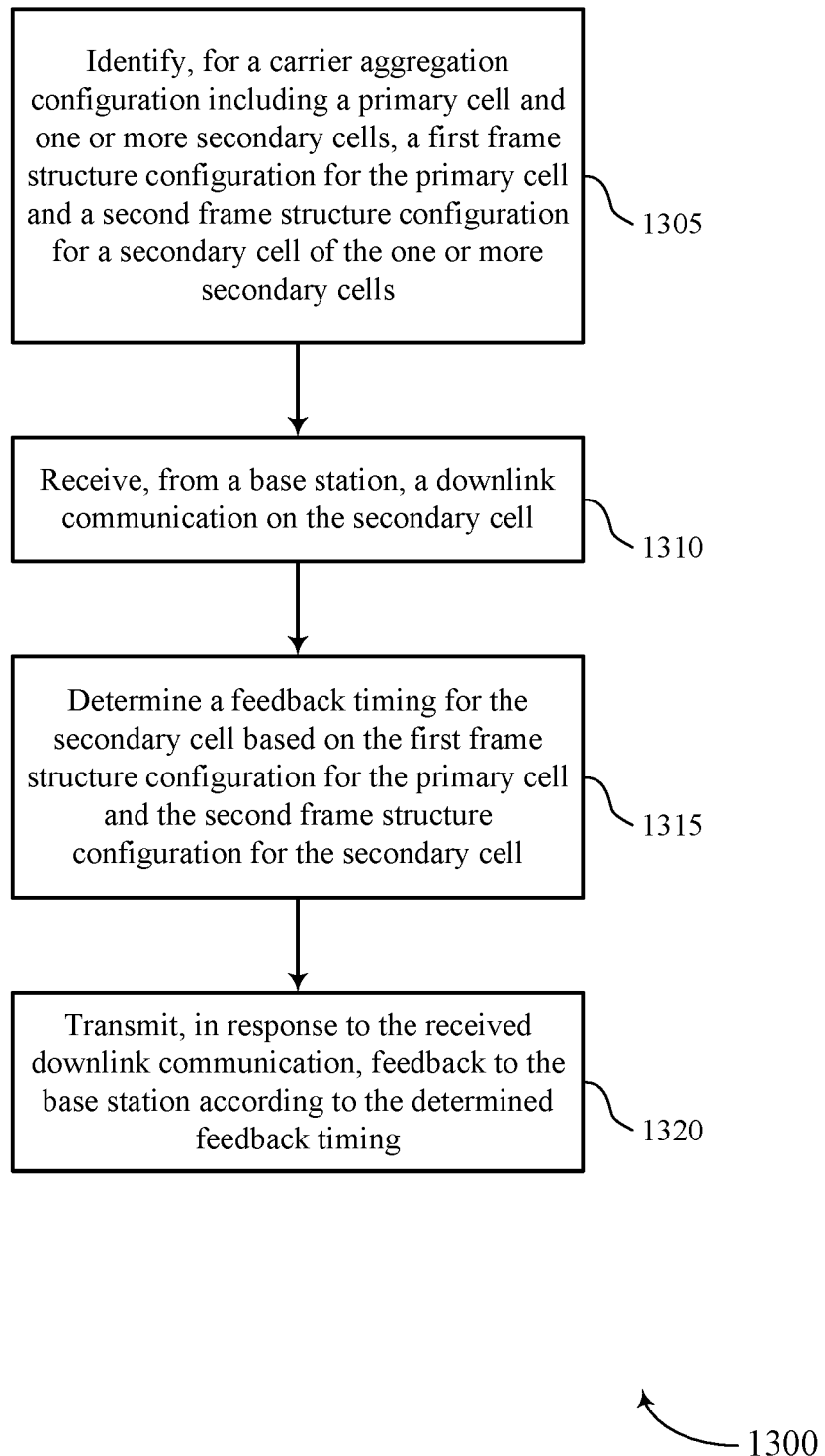
FIGS. 13 through 18 show flowcharts illustrating methods that support single transmitter switching for dual connectivity in accordance with aspects of the present disclosure.

FIG. 13 shows a flowchart illustrating a method 1300 that supports single transmitter switching for dual connectivity in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify, for a carrier aggregation configuration including a PCell and one or more SCells, a first frame structure configuration for the PCell and a second frame structure configuration for a SCell of the one or more SCells. The operations of 1305 may be performed according to the methods described herein. In some examples, aspects of the operations of 1305 may be performed by an UE frame structure configuration identifier as described with reference to FIGS. 5 through 8.

At 1310, the UE may receive, from a base station, a downlink communication on the SCell. The operations of 1310 may be performed according to the methods described herein. In some examples, aspects of the operations of 1310 may be performed by a downlink communication receiver as described with reference to FIGS. 5 through 8.

At 1315, the UE may determine a feedback timing for the SCell based on the first frame structure configuration for the PCell and the second frame structure configuration for the SCell. The operations of 1315 may be performed according to the methods described herein. In some examples, aspects of the operations of 1315 may be performed by an UE feedback timing determiner as described with reference to FIGS. 5 through 8.

At 1320, the UE may transmit, in response to the received downlink communication, feedback to the base station according to the determined feedback timing. The operations of 1320 may be performed according to the methods described herein. In some examples, aspects of the operations of 1320 may be performed by a feedback transmitter as described with reference to FIGS. 5 through 8.

Figure 14:
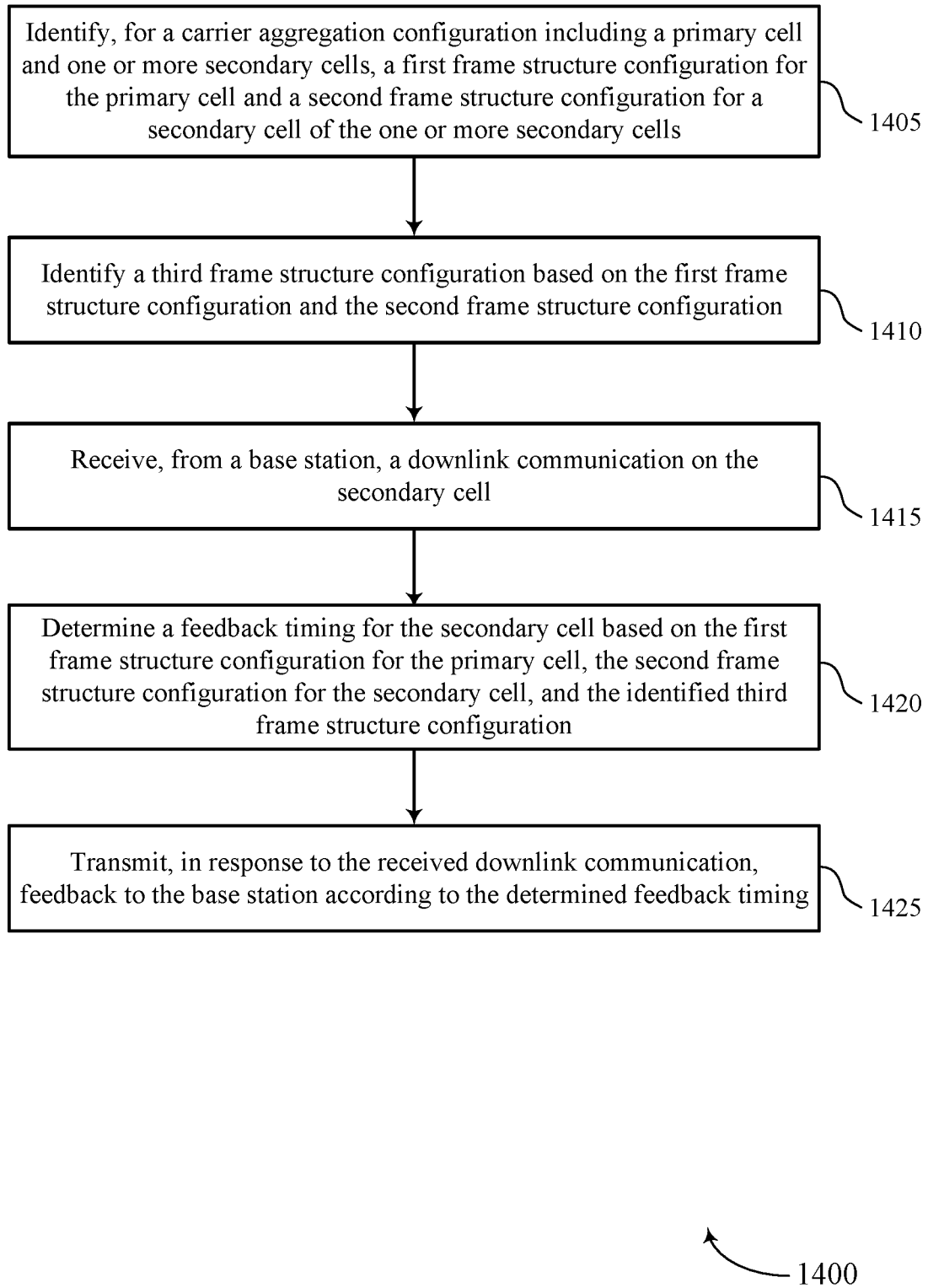

FIG. 14 shows a flowchart illustrating a method 1400 that supports single transmitter switching for dual connectivity in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify, for a carrier aggregation configuration including a PCell and one or more SCells, a first frame structure configuration for the PCell and a second frame structure configuration for a SCell of the one or more SCells. The operations of 1405 may be performed according to the methods described herein. In some examples, aspects of the operations of 1405 may be performed by an UE frame structure configuration identifier as described with reference to FIGS. 5 through 8.

At 1410, the UE may identify a third frame structure configuration based on the first frame structure configuration and the second frame structure configuration. The operations of 1410 may be performed according to the methods described herein. In some examples, aspects of the operations of 1410 may be performed by an UE frame structure configuration identifier as described with reference to FIGS. 5 through 8.

At 1415, the UE may receive, from a base station, a downlink communication on the SCell. The operations of 1415 may be performed according to the methods described herein. In some examples, aspects of the operations of 1415 may be performed by a downlink communication receiver as described with reference to FIGS. 5 through 8.

At 1420, the UE may determine a feedback timing for the SCell based on the first frame structure configuration for the PCell, the second frame structure configuration for the SCell, and the identified third frame structure. The operations of 1420 may be performed according to the methods described herein. In some examples, aspects of the operations of 1420 may be performed by an UE feedback timing determiner as described with reference to FIGS. 5 through 8.

At 1425, the UE may transmit, in response to the received downlink communication, feedback to the base station according to the determined feedback timing. The operations of 1425 may be performed according to the methods described herein. In some examples, aspects of the operations of 1425 may be performed by a feedback transmitter as described with reference to FIGS. 5 through 8.

Figure 15:
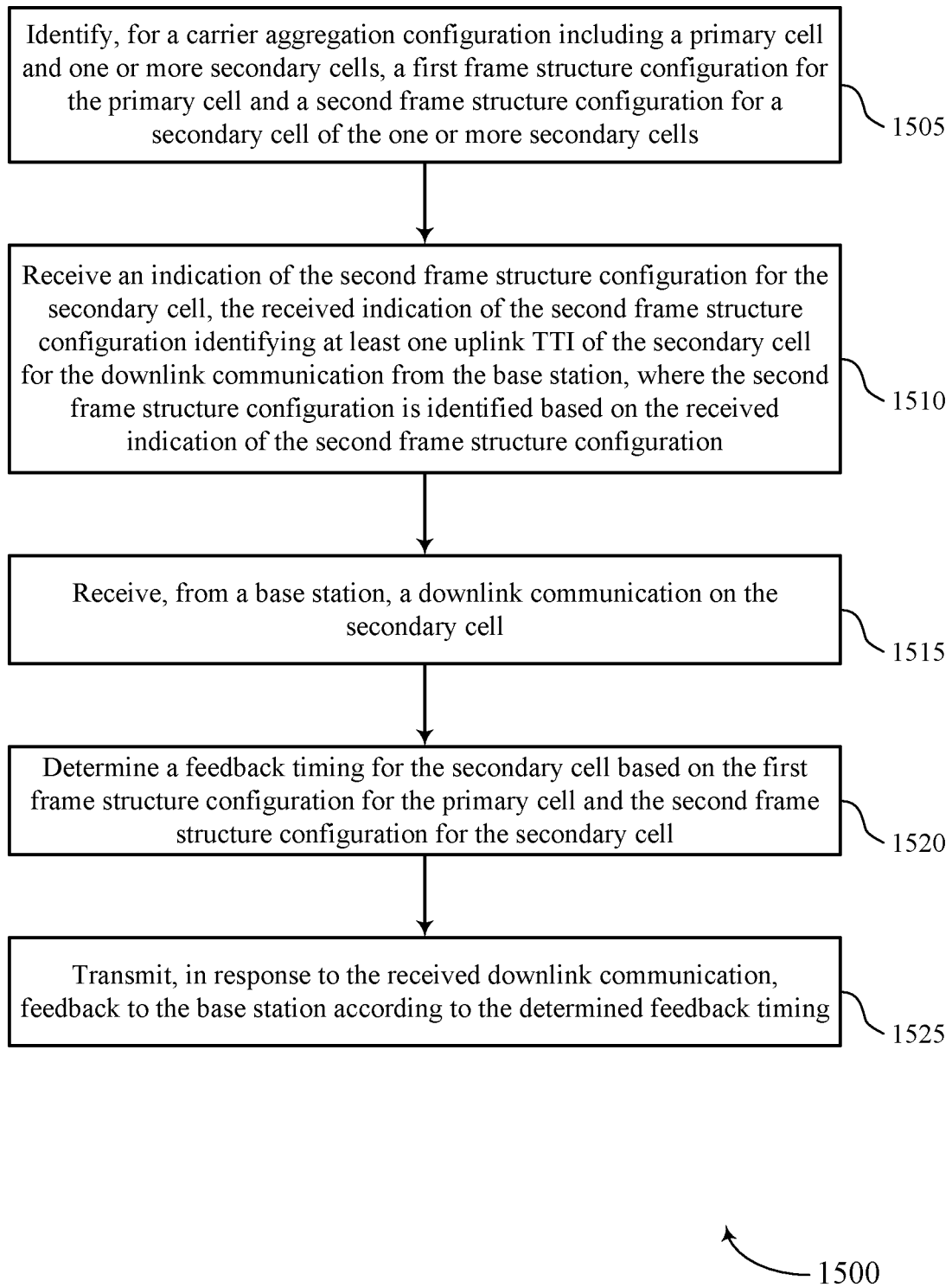

FIG. 15 shows a flowchart illustrating a method 1500 that supports single transmitter switching for dual connectivity in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify, for a carrier aggregation configuration including a PCell and one or more SCells, a first frame structure configuration for the PCell and a second frame structure configuration for a SCell of the one or more SCells. The operations of 1505 may be performed according to the methods described herein. In some examples, aspects of the operations of 1505 may be performed by an UE frame structure configuration identifier as described with reference to FIGS. 5 through 8.

At 1510, the UE may receive an indication of the second frame structure configuration for the SCell, the received indication of the second frame structure configuration identifying at least one uplink TTI of the SCell for the downlink communication from the base station, where the second frame structure configuration is identified based on the received indication of the second frame structure configuration. The operations of 1510 may be performed according to the methods described herein. In some examples, aspects of the operations of 1510 may be performed by a frame structure indication receiver as described with reference to FIGS. 5 through 8.

At 1515, the UE may receive, from a base station, a downlink communication on the SCell. The operations of 1515 may be performed according to the methods described herein. In some examples, aspects of the operations of 1515 may be performed by a downlink communication receiver as described with reference to FIGS. 5 through 8.

At 1520, the UE may determine a feedback timing for the SCell based on the first frame structure configuration for the PCell and the second frame structure configuration for the SCell. The operations of 1520 may be performed according to the methods described herein. In some examples, aspects of the operations of 1520 may be performed by an UE feedback timing determiner as described with reference to FIGS. 5 through 8.

At 1525, the UE may transmit, in response to the received downlink communication, feedback to the base station according to the determined feedback timing. The operations of 1525 may be performed according to the methods described herein. In some examples, aspects of the operations of 1525 may be performed by a feedback transmitter as described with reference to FIGS. 5 through 8.

Figure 16:
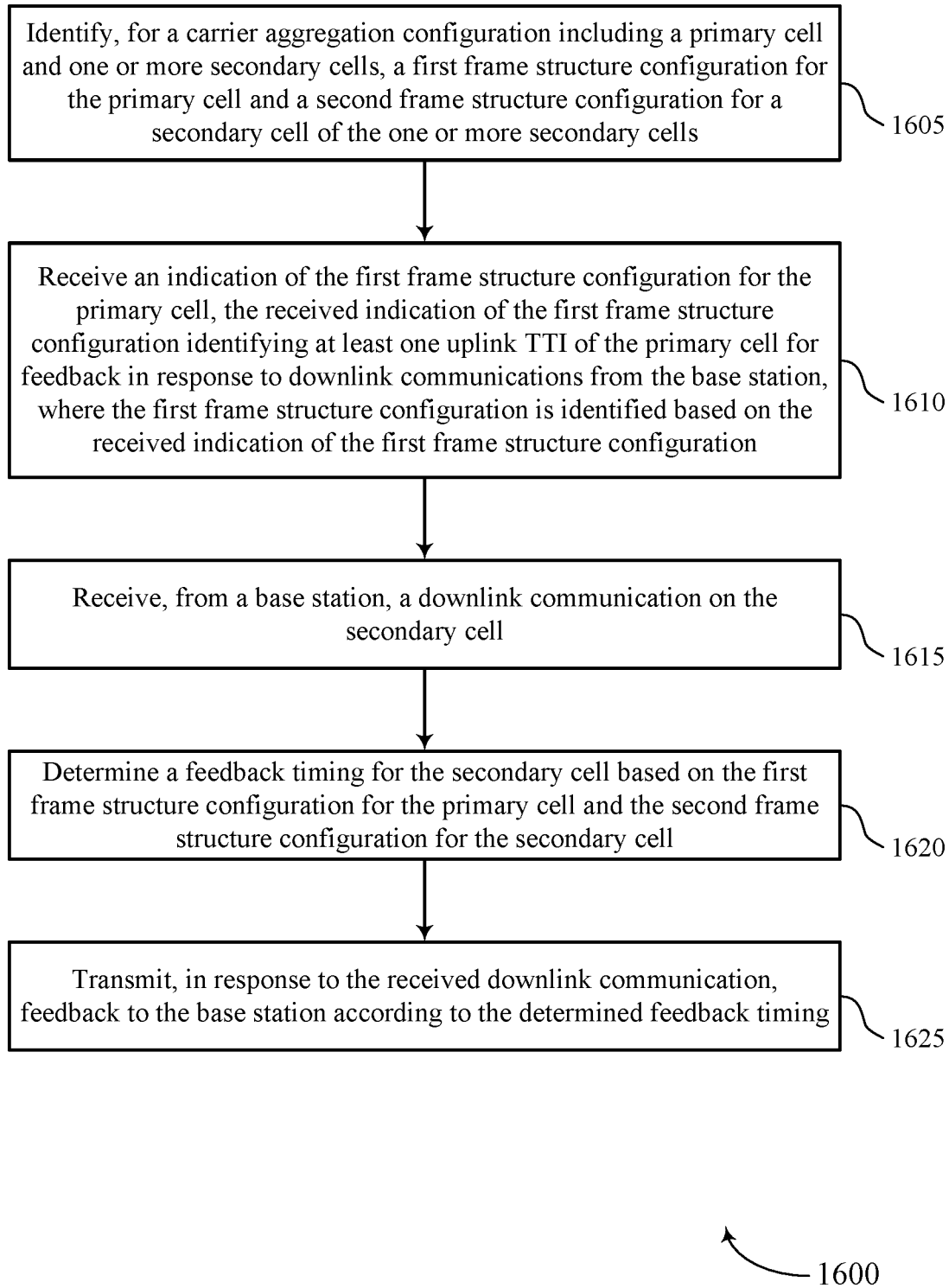

FIG. 16 shows a flowchart illustrating a method 1600 that supports single transmitter switching for dual connectivity in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may identify, for a carrier aggregation configuration including a PCell and one or more SCells, a first frame structure configuration for the PCell and a second frame structure configuration for a SCell of the one or more SCells. The operations of 1605 may be performed according to the methods described herein. In some examples, aspects of the operations of 1605 may be performed by an UE frame structure configuration identifier as described with reference to FIGS. 5 through 8.

At 1610, the UE may receive an indication of the first frame structure configuration for the PCell, the received indication of the first frame structure configuration identifying at least one uplink TTI of the PCell for feedback in response to downlink communications from the base station, where the first frame structure configuration is identified based on the received indication of the first frame structure configuration. The operations of 1610 may be performed according to the methods described herein. In some examples, aspects of the operations of 1610 may be performed by a frame structure indication receiver as described with reference to FIGS. 5 through 8.

At 1615, the UE may receive, from a base station, a downlink communication on the SCell. The operations of 1615 may be performed according to the methods described herein. In some examples, aspects of the operations of 1615 may be performed by a downlink communication receiver as described with reference to FIGS. 5 through 8.

At 1620, the UE may determine a feedback timing for the SCell based on the first frame structure configuration for the PCell and the second frame structure configuration for the SCell. The operations of 1620 may be performed according to the methods described herein. In some examples, aspects of the operations of 1620 may be performed by an UE feedback timing determiner as described with reference to FIGS. 5 through 8.

At 1625, the UE may transmit, in response to the received downlink communication, feedback to the base station according to the determined feedback timing. The operations of 1625 may be performed according to the methods described herein. In some examples, aspects of the operations of 1625 may be performed by a feedback transmitter as described with reference to FIGS. 5 through 8.

Figure 17:
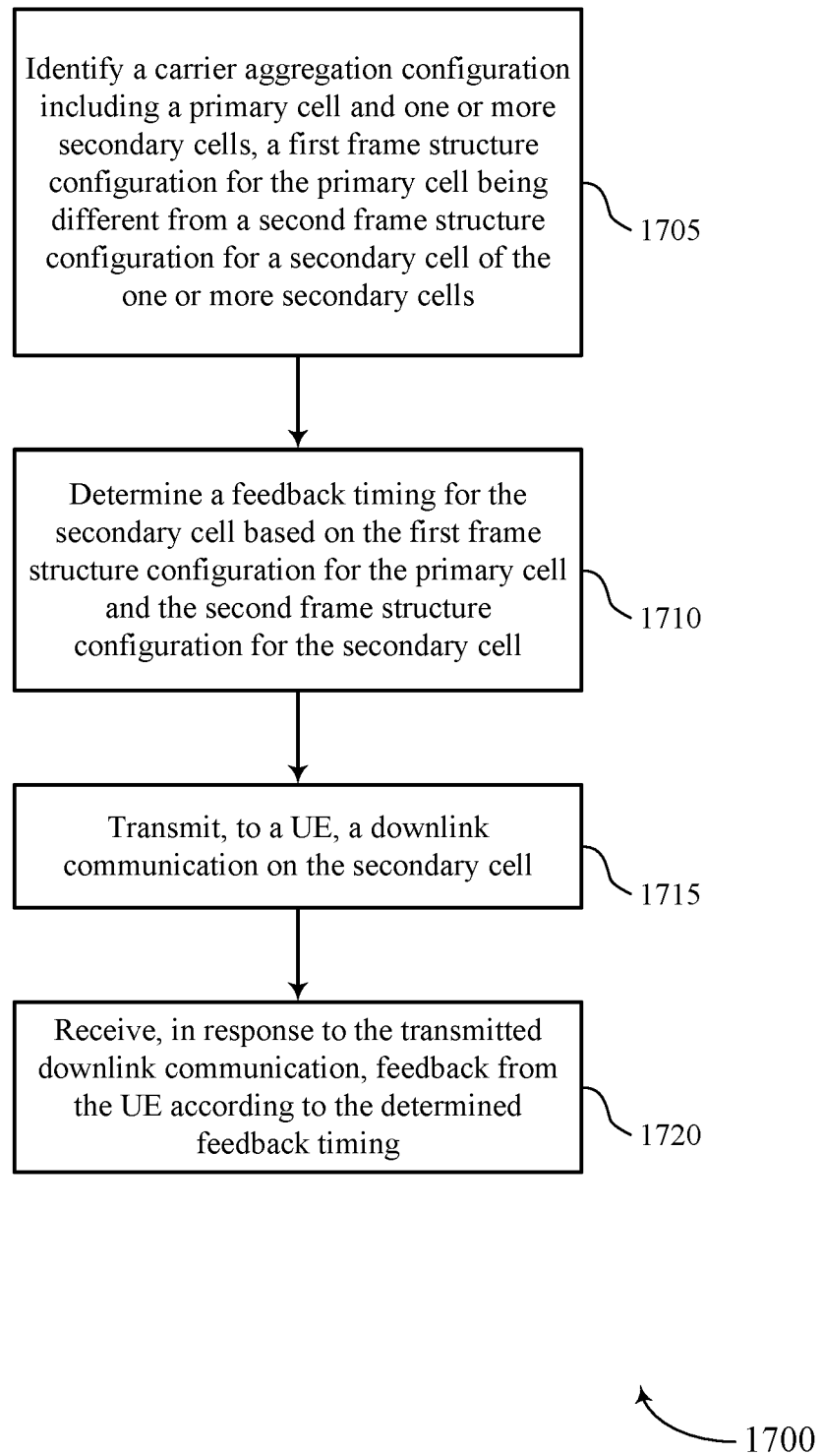

FIG. 17 shows a flowchart illustrating a method 1700 that supports single transmitter switching for dual connectivity in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify a carrier aggregation configuration including a PCell and one or more SCells, a first frame structure configuration for the PCell being different from a second frame structure configuration for a SCell of the one or more SCells. The operations of 1705 may be performed according to the methods described herein. In some examples, aspects of the operations of 1705 may be performed by a base station frame structure configuration identifier as described with reference to FIGS. 9 through 12.

At 1710, the base station may determine a feedback timing for the SCell based on the first frame structure configuration for the PCell and the second frame structure configuration for the SCell. The operations of 1710 may be performed according to the methods described herein. In some examples, aspects of the operations of 1710 may be performed by a base station feedback timing determiner as described with reference to FIGS. 9 through 12.

At 1715, the base station may transmit, to a UE, a downlink communication on the SCell. The operations of 1715 may be performed according to the methods described herein. In some examples, aspects of the operations of 1715 may be performed by a downlink communication transmitter as described with reference to FIGS. 9 through 12.

At 1720, the base station may receive, in response to the transmitted downlink communication, feedback from the UE according to the determined feedback timing. The operations of 1720 may be performed according to the methods described herein. In some examples, aspects of the operations of 1720 may be performed by a feedback receiver as described with reference to FIGS. 9 through 12.

Figure 18:
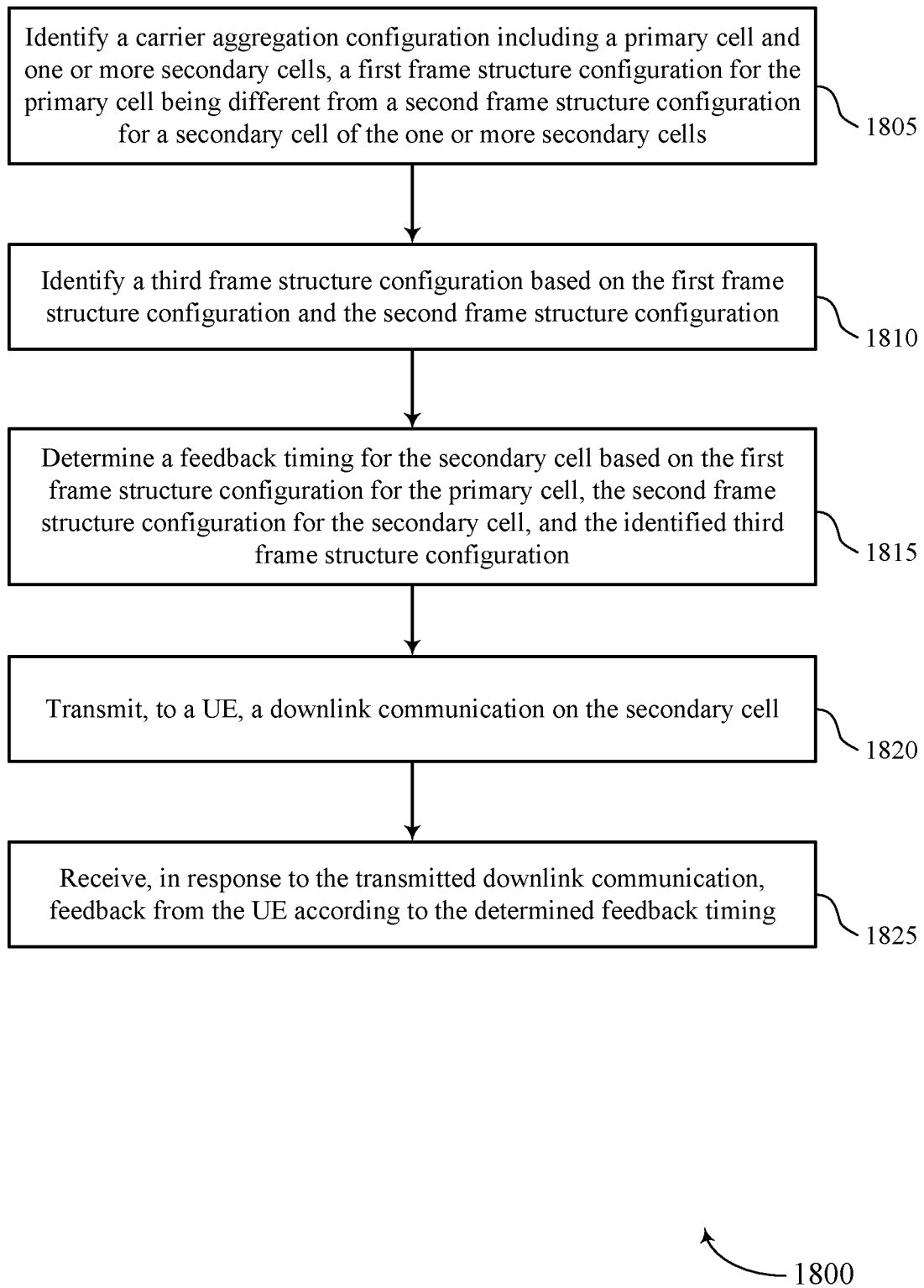

FIG. 18 shows a flowchart illustrating a method 1800 that supports single transmitter switching for dual connectivity in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may identify a carrier aggregation configuration including a PCell and one or more SCells, a first frame structure configuration for the PCell being different from a second frame structure configuration for a SCell of the one or more SCells. The operations of 1805 may be performed according to the methods described herein. In some examples, aspects of the operations of 1805 may be performed by a base station frame structure configuration identifier as described with reference to FIGS. 9 through 12.

At 1810, the base station may identify a third frame structure configuration based on the first frame structure configuration and the second frame structure configuration. The operations of 1810 may be performed according to the methods described herein. In some examples, aspects of the operations of 1810 may be performed by a base station frame structure configuration identifier as described with reference to FIGS. 9 through 12.

At 1815, the base station may determine a feedback timing for the SCell based on the first frame structure configuration for the PCell, the second frame structure configuration for the SCell, and the identified third frame structure configuration. The operations of 1815 may be performed according to the methods described herein. In some examples, aspects of the operations of 1815 may be performed by a base station feedback timing determiner as described with reference to FIGS. 9 through 12.

At 1820, the base station may transmit, to a UE, a downlink communication on the SCell. The operations of 1820 may be performed according to the methods described herein. In some examples, aspects of the operations of 1820 may be performed by a downlink communication transmitter as described with reference to FIGS. 9 through 12.

At 1825, the base station may receive, in response to the transmitted downlink communication, feedback from the UE according to the determined feedback timing. The operations of 1825 may be performed according to the methods described herein. In some examples, aspects of the operations of 1825 may be performed by a feedback receiver as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying, for a carrier aggregation configuration comprising a primary cell and one or more secondary cells, a first frame structure configuration for the primary cell and a second frame structure configuration for a secondary cell of the one or more secondary cells;
   receiving, from a base station, a downlink communication on the secondary cell;
   determining a feedback timing for the secondary cell based at least in part on the first frame structure configuration for the primary cell and the second frame structure configuration for the secondary cell, wherein determining the feedback timing comprises identifying a third frame structure configuration based at least in part on the first frame structure configuration and the second frame structure configuration and determining the feedback timing according to the identified third frame structure configuration; and
   transmitting, in response to the received downlink communication, feedback to the base station according to the determined feedback timing.

2. The method of claim 1, further comprising:
   receiving an indication of the first frame structure configuration for the primary cell, the received indication of the first frame structure configuration identifying at least one uplink TTI of the primary cell for feedback in response to downlink communications from the base station, wherein the first frame structure configuration is identified based at least in part on the received indication of the first frame structure configuration.

3. The method of claim 2, wherein receiving the indication of the first frame structure configuration comprises:
   receiving radio resource control signaling comprising the indication of the first frame structure configuration.

4. The method of claim 2, wherein the secondary cell operates according to a frequency division duplexing mode.

5. The method of claim 4, wherein the primary cell operates according to a time division duplexing mode.

6. The method of claim 2, further comprising:
   receiving an indication of a fourth frame structure configuration for the primary cell, the fourth frame structure configuration identifying at least one downlink TTI for downlink communications from the base station on the primary cell; and determining a feedback timing for the primary cell based at least in part on the first frame structure configuration for the primary cell and the fourth frame structure configuration for the primary cell.

7. The method of claim 6, wherein receiving the indication of the fourth frame structure configuration comprises:

receiving system information comprising the indication of the fourth frame structure configuration.

8. The method of claim 1, wherein identifying the third frame structure configuration comprises:

mapping a first indicator of the first frame structure configuration and a second indicator of the second frame structure configuration to a third indicator of the third frame structure configuration.

9. The method of claim 1, wherein the third frame structure configuration is a different frame structure configuration than the first frame structure configuration and the second frame structure configuration.

10. The method of claim 1, wherein the third frame structure configuration is a same frame structure configuration as the first frame structure configuration or the second frame structure configuration.

11. The method of claim 1, further comprising:

receiving an indication of the second frame structure configuration for the secondary cell, the received indication of the second frame structure configuration identifying at least one uplink transmission time interval (TTI) of the secondary cell for the downlink communication from the base station, wherein the second frame structure configuration is identified based at least in part on the received indication of the second frame structure configuration.

12. The method of claim 11, wherein receiving the indication of the second frame structure configuration comprises:

receiving system information comprising the indication of the second frame structure configuration.

13. The method of claim 1, wherein:

the primary cell operates according to a frequency division duplexing mode or a time division duplexing mode; and the secondary cell operates according to the time division duplexing mode.

14. The method of claim 1, wherein the carrier aggregation configuration comprises a dual connectivity configuration comprising a master cell group and a secondary cell group, the primary cell in the master cell group and the secondary cell in the secondary cell group.

15. The method of claim 14, wherein the master cell group operates according to a first radio access technology, and the secondary cell group operates according to a second radio access technology.

16. The method of claim 1, wherein the UE is configured for single transmitter operation.

17. The method of claim 1, further comprising:

receiving an indication of a time division multiplexing pattern; and transmitting, according to the time division multiplexing pattern, an uplink transmission using a shortened TTI on the secondary cell, the secondary cell configured to operate according to a frequency division duplexing mode.

18. A method comprising for wireless communication at a base station, comprising:

identifying a carrier aggregation configuration comprising a primary cell and one or more secondary cells, a first frame structure configuration for the primary cell being different from a second frame structure configuration for a secondary cell of the one or more secondary cells;

determining a feedback timing for the secondary cell based at least in part on the first frame structure configuration for the primary cell and the second frame structure configuration for the secondary cell, wherein determining the feedback timing comprises identifying a third frame structure configuration based at least in part on the first frame structure configuration and the second frame structure configuration and determining the feedback timing according to the identified third frame structure configuration;

transmitting, to a user equipment (UE), a downlink communication on the secondary cell; and receiving, in response to the transmitted downlink communication, feedback from the UE according to the determined feedback timing.

19. The method of claim 18, further comprising:

transmitting an indication of the first frame structure configuration for the primary cell, the transmitted indication of the first frame structure configuration identifying at least one uplink TTI of the primary cell for feedback in response to downlink communications from the base station, wherein the first frame structure configuration is identified based at least in part on the transmitted indication of the first frame structure configuration.

20. The method of claim 19, wherein transmitting the indication of the first frame structure configuration comprises:

transmitting radio resource control signaling comprising the indication of the first frame structure configuration.

21. The method of claim 19, wherein the secondary cell operates according to a frequency division duplexing mode.

22. The method of claim 21, wherein the primary cell operates according to a time division duplexing mode.

23. An apparatus for wireless communication at a user equipment (UE), comprising: at least one processor, memory coupled with the processor; and instructions stored in the memory and executable by the at least one processor to cause the apparatus to:

identify, for a carrier aggregation configuration comprising a primary cell and one or more secondary cells, a first frame structure configuration for the primary cell and a second frame structure configuration for a secondary cell of the one or more secondary cells;

receive, from a base station, a downlink communication on the secondary cell;

determine a feedback timing for the secondary cell based at least in part on the first frame structure configuration for the primary cell and the second frame structure configuration for the secondary cell, wherein determining the feedback timing comprises identifying a third frame structure configuration based at least in part on the first frame structure configuration and the second frame structure configuration and determining the feedback timing according to the identified third frame structure configuration; and transmit, in response to the received downlink communication, feedback to the base station according to the determined feedback timing.

24. The apparatus of claim 23, wherein the instructions are further executable by the at least one processor to cause the apparatus to:

receive an indication of the first frame structure configuration for the primary cell, the received indication of the first frame structure configuration identifying at least one uplink TTI of the primary cell for feedback in response to downlink communications from the base station, wherein the first frame structure configuration is identified based at least in part on the received indication of the first frame structure configuration.

25. The apparatus of claim 24, wherein the instructions to receive the indication of the first frame structure configuration are executable by the at least one processor to cause the apparatus to:
  receive radio resource control signaling comprising the indication of the first frame structure configuration.

26. The apparatus of claim 24, wherein:
  the primary cell operates according to a time division duplexing mode; and
  the secondary cell operates according to a frequency division duplexing mode.

27. An apparatus for wireless communication at a base station, comprising: at least one processor, memory coupled with the processor; and instructions stored in the memory and executable by the at least one processor to cause the apparatus to:
  identify a carrier aggregation configuration comprising a primary cell and one or more secondary cells, a first frame structure configuration for the primary cell being different from a second frame structure configuration for a secondary cell of the one or more secondary cells;
  determine a feedback timing for the secondary cell based at least in part on the first frame structure configuration for the primary cell and the second frame structure configuration for the secondary cell, wherein determining the feedback timing comprises identifying a third frame structure configuration based at least in part on the first frame structure configuration and the second frame structure configuration and determining the feedback timing according to the identified third frame structure configuration;
  transmit, to a user equipment (UE), a downlink communication on the secondary cell; and
  receive, in response to the transmitted downlink communication, feedback from the UE according to the determined feedback timing.

28. The apparatus of claim 27, wherein the instructions are further executable by the at least one processor to cause the apparatus to:
  transmit an indication of the first frame structure configuration for the primary cell, the transmitted indication of the first frame structure configuration identifying at least one uplink TTI of the primary cell for feedback in response to downlink communications from the base station, wherein the first frame structure configuration is identified based at least in part on the transmitted indication of the first frame structure configuration.

29. The apparatus of claim 28, wherein the instructions to transmit the indication of the first frame structure configuration are executable by the at least one processor to cause the apparatus to:
  transmit radio resource control signaling comprising the indication of the first frame structure configuration, wherein the primary cell operates according to a time division duplexing mode, and the secondary cell operates according to a frequency division duplexing mode.

* * * * *